United States Patent
Yamada et al.

[11] Patent Number: 6,134,355
[45] Date of Patent: Oct. 17, 2000

[54] BINARIZATION USING A LOCAL AVERAGE, AND USING ERROR DIFFUSION

[75] Inventors: Yasuhiro Yamada; Hiroshi Tanioka, both of Yokohama, Japan

[73] Assignee: Canon Kabushiki Kaisha, Tokyo, Japan

[21] Appl. No.: 08/482,044

[22] Filed: Jun. 7, 1995

Related U.S. Application Data

[63] Continuation of application No. 08/111,587, Aug. 25, 1993, abandoned, which is a continuation of application No. 07/938,519, Sep. 2, 1992, abandoned, which is a continuation of application No. 07/476,766, Feb. 8, 1990, abandoned.

[30] Foreign Application Priority Data

Feb. 10, 1989 [JP] Japan ..................... 1-031404
Feb. 10, 1989 [JP] Japan ..................... 1-031405
Feb. 10, 1989 [JP] Japan ..................... 1-031408
Feb. 10, 1989 [JP] Japan ..................... 1-031409

[51] Int. Cl.⁷ .................................................. G06K 9/38
[52] U.S. Cl. ........................... 382/272; 358/456; 358/466
[58] Field of Search ............................... 358/445, 447, 358/455, 456, 457, 458; 382/272, 275, 252, 270, 237

[56] References Cited

U.S. PATENT DOCUMENTS

| | | | |
|---|---|---|---|
| 4,371,179 | 2/1983 | Kato et al. ........................... | 364/515 |
| 4,667,249 | 5/1987 | Owada et al. ........................ | 358/447 |
| 4,841,374 | 6/1989 | Kotani et al. ........................ | 358/456 |
| 4,853,792 | 8/1989 | Katsuta et al. ...................... | 358/455 |
| 4,975,786 | 12/1990 | Katayama et al. .................... | 358/457 |
| 5,055,942 | 10/1991 | Levien ................................. | 358/456 |

FOREIGN PATENT DOCUMENTS

| | | |
|---|---|---|
| 57-104369 | 6/1982 | Japan . |
| 1-276969 | 11/1989 | Japan . |

*Primary Examiner*—Bravesh Mehta
*Attorney, Agent, or Firm*—Fitzpatrick, Cella, Harper & Scinto

[57] ABSTRACT

There is provided an image processing apparatus such as facsimile apparatus or digital copying machine for digitizing image data into two values or multi-values. The apparatus comprises: an input device to input data of a target pixel to be digitized; a calculating circuit to obtain an average density value of a predetermined region; a digitizing circuit such as a binarizing circuit for digitizing or binarizing the target pixel data on the basis of the average density value obtained by the calculating circuit; and a correction circuit to correct a difference which occurs upon digitization by the digitizing circuit. The calculating circuit calculates the average density value $m_1$ of the pre-determined region when the target pixel data was binarized to 1 and the average density value $m_2$ of the predetermined region when the target pixel data was binarized to 0 by using a predetermined weighting mask. The digitizing circuit binarizes the target pixel data by using $(m_1+m_2)/2$ as a threshold value. When the difference between the target pixel data and the average density value is within a predetermined value, the difference is corrected, so that an image of excellent gradation can be reproduced. When it is equal to or larger than the predetermined value, the difference is not corrected, so that the resolution of a character portion such as an edge portion can be improved.

37 Claims, 17 Drawing Sheets

FIG. 1

(1) MULTI-LEVEL IMAGE

| f(i-2, j-1) | f(i-2, j) | f(i-2, j+1) |
|---|---|---|
| f(i-1, j-1) | f(i-1, j) | f(i-1, j+1) |
| f(i, j-1) | f(i, j) | f(i, j+1) |

(2) BINARY IMAGE

| B(i-2, j-1) | B(i-2, j) | B(i-2, j+1) |
|---|---|---|
| B(i-1, j-1) | B(i-1, j) | B(i-1, j+1) |
| B(i, j-1) | B(i, j) | |

(3) WEIGHTING MASK

| R(2, 1) | R(2, 0) | R(2, -1) |
|---|---|---|
| R(1, 1) | R(1, 0) | R(1, -1) |
| R(0, 1) | R(0, 0) | R(0, -1) |

| 7 BIT | B=1 | B=0 |
|---|---|---|
| 0 | -9 | +9 |
| 1 | -8 | +8 |
| ⋮ | | |
| 8 | -1 | +1 |
| 9 | 0 | 0 |
| 10 | +1 | -1 |
| ⋮ | | |
| 26 | +17 | -17 |
| 27 | +18 | -18 |
| 28 | +19 | -19 |
| 29 | +20 | -20 |
| ⋮ | | |
| 127 | +118 | -118 |

| 7 BIT | B=1 | B=0 |
|---|---|---|
| 0 | -9 | +9 |
| 1 | -8 | +8 |
| ⋮ | | |
| 8 | -1 | +1 |
| 9 | 0 | 0 |
| 10 | +1 | -1 |
| ⋮ | | |
| 26 | +17 | -17 |
| 27 | +18 | -18 |
| 28 | 0 | 0 |
| 29 | 0 | 0 |
| ⋮ | | |
| 127 | 0 | 0 |

(B=1 and B=0 columns grouped as B)

FIG. 14

(1) MULTI-LEVEL IMAGE

| $f(i-2, j-1)$ | $f(i-2, j)$ | $f(i-2, j+1)$ |
|---|---|---|
| $f(i-1, j-1)$ | $f(i-1, j)$ | $f(i-1, j+1)$ |
| $f(i, j-1)$ | $f(i, j)$ | $f(i, j+1)$ |

(2) BINARY IMAGE

| $B(i-2, j-1)$ | $B(i-2, j)$ | $B(i-2, j+1)$ |
|---|---|---|
| $B(i-1, j-1)$ | $B(i-1, j)$ | $B(i-1, j+1)$ |
| $B(i, j-1)$ | $B(i, j)$ | |

(3) WEIGHTING MASK

| $R(2, 1)$ | $R(2, 0)$ | $R(2, -1)$ |
|---|---|---|
| $R(1, 1)$ | $R(1, 0)$ | $R(1, -1)$ |
| $R(0, 1)$ | $R(0, 0)$ | $R(0, -1)$ |

$R(0, 0) = R(0, -1) = 0$

| 1/21 | 3/21 | 1/21 |
|------|------|------|
| 3/21 | 5/21 | 3/21 |
| 5/21 | 0 | 0 |

| 1/48 | 3/48 | 5/48 | 3/48 | 1/48 |
|------|------|------|------|------|
| 3/48 | 5/48 | 7/48 | 5/48 | 3/48 |
| 5/48 | 7/48 | 0 | 0 | 0 |

BINARIZATION USING A LOCAL AVERAGE, AND USING ERROR DIFFUSION

RELATED APPLICATIONS

This application is a continuation of application Ser. No. 08/111,587, filed Aug. 25, 1993, which was a continuation of application Ser. No. 07/938,519, filed Sep. 2, 1992, which was a continuation of application Ser. No. 07/476,766, filed Feb. 8, 1990, all of which prior applications are abandoned.

BACKGROUND OF THE INVENTION

1. Field of the Invention

The present invention relates to an image processing apparatus for digitizing image data to binary values or multi-levels and, more particularly, to an image processing apparatus for half-tone processing input image data.

2. Related Background Art

Hitherto, in image processing apparatuses such as facsimile apparatus, digital copying machine, and the like, an error diffusion method and an average density approximating method have been proposed as a half-tone processing system.

The former error diffusion method has been disclosed in the literature by R. Floyd & L. Steinberg, "AN ADAPTIVE ALGORITHM FOR SPATIAL GRAY SCALE", SID 75 DIGEST, pp 36 to 37. According to the error diffusion method, multi-level image data of a target pixel is binarized (converted into a highest density level or a lowest density level) and a difference between the binary level and the multi-value image data before the binarization is added with a predetermined weight and the resultant data is added to the data of the pixel near the target pixel.

The applicant of the present invention has already filed U.S. patent application Ser. Nos. 137,439, 140,029, 145,593, 192,601, 203,880, 270,809, 284,603, 289,017 and 319,057 as techniques for half-tone processing image data by the error diffusion method.

On the other hand, as disclosed in Japanese Unexamined Patent Publication (Kokai) No. 57-104369, according to the latter average density approximating method, the target pixel is binarized to black or white by using the already binarized data of pixels near the target pixel, the weighting average values with the respective pixels near the target pixel are obtained, the average of the two average values is set to a threshold value, and the image data of the target pixel is binarized on the basis of the threshold value.

Since the above error diffusion method is of the type in which the difference between the input image data and the output image data is corrected, the densities of the input image and the output image can be preserved, so that an image having excellent resolution and gradation can be provided.

However, in the error diffusion method, when the difference between the input image data and the output image data is corrected, many two-dimensional calculations must be executed, so that there is a drawback such that a hardware construction is very complicated because of a very large processing amount.

On the other hand, in the average density approximating method, since the calculations are performed by using the binary data after completion of the binarization, a hardware construction can be simplified and a high processing speed can be realized because of a very small processing amount.

However, in the average density approximating method, the target pixel is merely approximated to the average value of the region including the target pixel and is binarized. Therefore, there are drawbacks such that the number of gradations is limited, a texture of a low frequency which is peculiar to the image having a gentle density change occurs, and the picture quality deteriorates.

SUMMARY OF THE INVENTION

It is an object of the present invention to eliminate the drawbacks of the conventional techniques as mentioned above and to provide an image processing apparatus in which an image having excellent gradation and resolution can be obtained in a short time by a simple hardware construction.

To accomplish the above object, an image processing apparatus according to the invention comprises: input means for inputting data of a target pixel; calculating means for obtaining an average density value of a predetermined region; digitizing means for digitizing the data of the target pixel on the basis of the average density value obtained by the calculating means; and correcting means for correcting a difference which occurs upon digitization by the digitizing means.

Another object of the invention is to provide an image processing apparatus in which an average density value which was calculated from binarized data is set to a threshold value and data of a target pixel is binarized on the basis of the threshold value.

Still another object of the invention is to provide an image processing apparatus in which when a difference between the data of a target pixel and the average density value is set to a predetermined value or less, by correcting the difference, an image having an excellent gradation can be reproduced.

Still another object of the invention is to provide an image processing apparatus in which when a difference between the data of a target pixel and the average density value is set to a predetermined value or more, the error is not corrected, so that the resolution of a character portion can be improved.

The above and other objects and features of the present invention will become apparent from the following detailed description and the appended claims with reference to the accompanying drawings.

BRIEF DESCRIPTION OF THE DRAWINGS

FIGS. 1 and 14 are diagrams showing a multi-level image, a binary image, and a weighting mask of each pixel;

FIGS. 3, 13, 17A, and 17B are diagrams showing examples of weighting masks;

FIG. 6 is a diagram showing an example of a table stored in an ROM 12 in FIG. 5;

FIG. 11 is a diagram showing an example of a table stored in an ROM 100 in FIG. 10;

FIG. 12 is a diagram for explaining the embodiment 4;

FIG. 20 is a diagram for explaining the embodiment 9; and

DETAILED DESCRIPTION OF THE PREFERRED EMBODIMENTS

Figure 2:
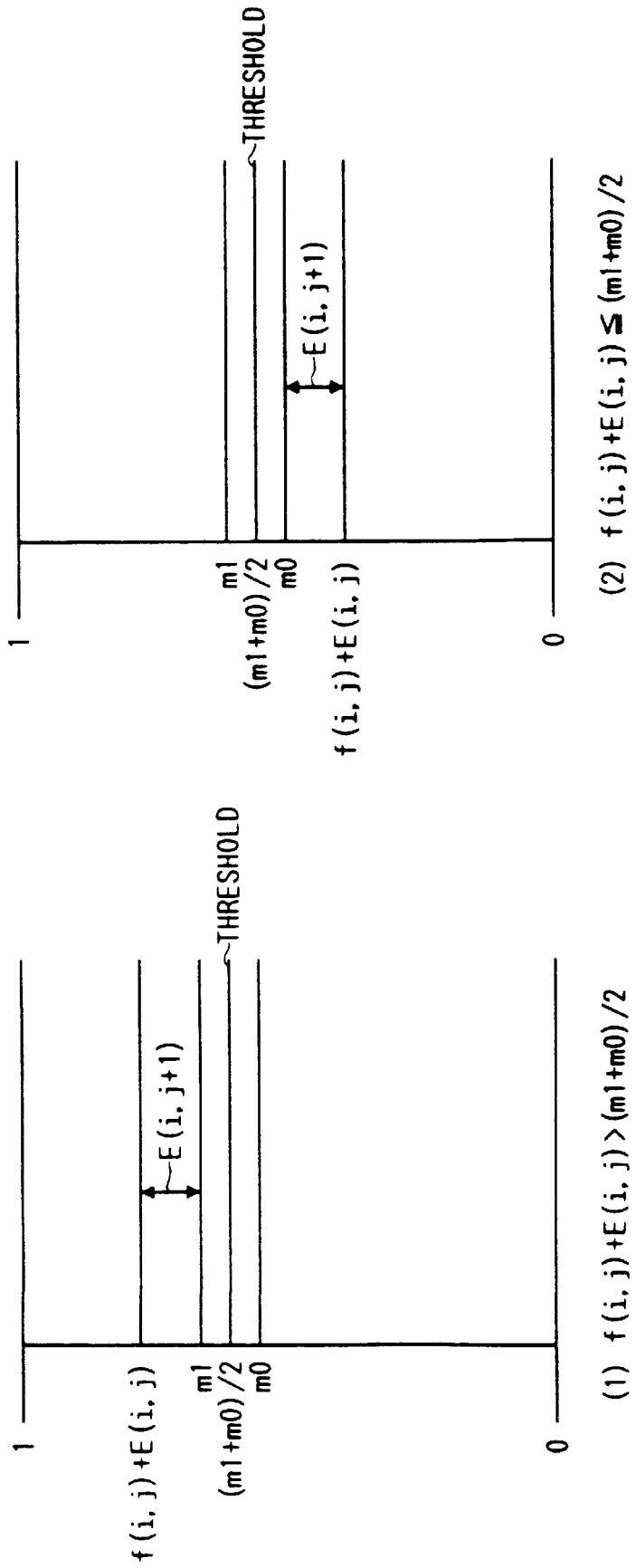
FIGS. 2 and 15 are diagrams showing a difference which occurs upon binarization.

Embodiments of the present invention will be described in detail hereinbelow with reference to the drawings.

Embodiment 1

The principle of the present system will be first described.

FIG. 1(1) is a diagram showing multi-level data of each pixel of an input image.

In FIG. 1(1), f(i, j) denotes multi-level density data of an input image at the position of a target pixel to be binarized and is set to a normalized value of 0 to 1. On the other hand, the binarizing process has already been finished at pixel positions above a broken line. After the target pixel was binarized, subsequent pixels of f(i, j+1), f(i, j+2), etc. are sequentially binarized.

FIG. 1(2) is a diagram showing binary image data. B(i, j) denotes a density (having a value of 0 or 1) after the target pixel was binarized. The portion surrounded by a broken line relates to the pixel data which has already been binarized when the target pixel is processed. Those binarized pixel data are used when the target pixel is binarized.

FIG. 1(3) is a diagram showing weighting masks. R denotes an example of a weighting mask to obtain an average density and is expressed by a matrix of a size of 3×3. The weight at the position corresponding to the target pixel is set to R(0, 0) and R(0, -1)=0 is used.

According to the system, the average densities of the output image near the target pixel in the case where the target pixel will be binarized into black and white are obtained by the following equations:

$$m_1(i, j) = \frac{1}{S} \sum_{x=0}^{2} \sum_{y=-1}^{1} R(x, y) \cdot B(i-x, j-y) \quad \text{①}$$

(where this equation is evaluated with B(i,j)=1, that is, where the target pixel will be binarized to black and; (where this equation is evaluated with B(i,j)=0, that is, where the target pixel will be binarized to white). S=29. In the case of using the weighting mask 2, S=58.

The multi-level density f(i,j) of the target pixel is binarized by using the average densities $m_1$ and $m_0$ is binarized by the following equations.

$$\left.\begin{array}{l}\text{When } f(i, j) + E(i, j) > (m_1(i, j) + m_0(i, j))/2, \\ \quad B(i, j) = 1, \\ E(i, j+1) = f(i, j) + E(i, j) - m_1(i, j) \\ \text{When } f(i, j) + E(i, j) \leq (m_1(i, j) + m_0(i, j))/2, \\ \quad B(i, j) = 0, \\ E(i, j+1) = f(i, j) + E(i, j) - m_0(i, j)\end{array}\right\} \quad \text{③}$$

In the equation ③, E(i,j) denotes a difference which occurs when a multi-level density f(i,j-1) of the pixel (i,j-1) which is precedent to the target pixel (i,j) by one pixel was binarized to a binary density B(i,j-1). That is, the process such that the input pixel density f(i,j-1) was binarized to 1 or 0 means that the pixel (i,j-1) was approximated to either $m_1(i,j-1)$ or $m_0(i,j-1)$ as an average density near the pixel (i,j-1). In each case, the difference of $f(i,j-1)-m_1$ or $f(i,j-1)-m_0$ occurs with the multi-level density f(i,j-1) of the input image. Therefore, the value corrected by adding the binary difference E(i,j) to the target pixel f(i,j) is binarized, so that density on the image after completion of the binarization can be completely preserved with respect to the whole input image region. Thus, in the present system, each point is binarized in consideration of the binarization difference. As compared with the above average density approximating method, the half-tone reproducing capability is remarkably improved.

In the equation ③, E(i, j+1) denotes a difference which is distributed to the pixel (i, j+1) which is subsequent to the target pixel (i,j) by one pixel. As shown in FIG. 2, E(i,j+1) is set to a value which is obtained by subtracting $m_1$ from $f(i,j)+E(i,j)$ in the case where $f(i,j)+E(i,j)>(m_1+m_0)/2$. E(i, j+1) is set to a value which is obtained by subtracting $m_0$ from $f(i,j)+E(i,j)$ in the case where $f(i,j)+E(i,j)\leq(m_1+m_0)/2$.

As mentioned above, the reason why in spite of the fact that a processing amount in the case of the average density preserving method in the embodiment is extremely smaller than that in the error diffusion method, the image reproducing capability which is equal to or higher than that in the error diffusion method can be obtained is because) in spite of the fact that the difference is merely corrected by using one pixel adjacent to the target pixel, by obtaining the average densities by using a plurality of data after completion of the binarization, the effect similar to that in the case of correcting by distributing the differences to a plurality of pixels is equivalently obtained.

In terms of this point, it will be obviously understood that the above average density approximating method does not consider the differences as in the present system and the image reproducing capability of the present system is fairly better than that of the average density approximating method.

Figure 4:
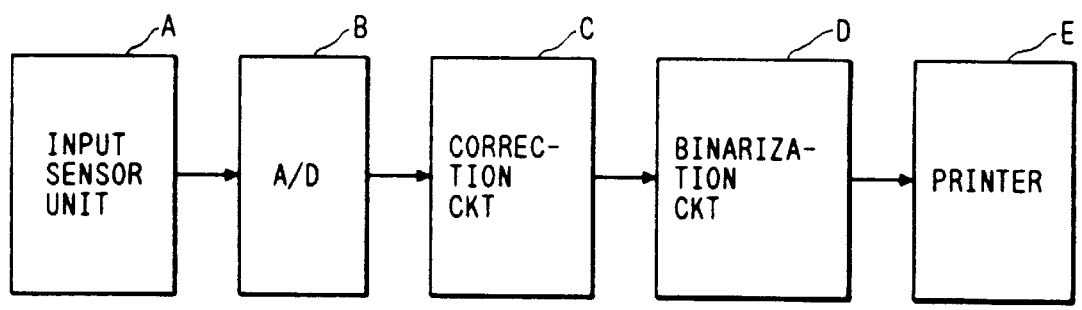
FIG. 4 is a block diagram showing a construction of an image processing apparatus in an embodiment.

FIG. 4 is a block diagram of an image processing apparatus showing an embodiment of the invention. An input sensor unit A comprises a photoelectric converting element such as a CCD or the like and a drive apparatus for scanning the photoelectric converting element. The input sensor unit A reads and scans an original. The image data of the original which was read by the input sensor unit A is successively transmitted to an A/D converter B. The A/D converter B converts the data of each pixel into 6-bit digital data, thereby digitizing into the data having the gradations of 64 levels. Next, a shading correction and the like to correct a sensitivity variation of the CCD sensor and an illuminance variation by an illuminating light source are executed by digital calculating processes in a correction circuit C. Next, the corrected data is sent to a binarization circuit D. In the binarization circuit D, the 6-bit multi-level image data which was input is digitized into the 1-bit binary data by the foregoing system. A printer E is constructed by a laser beam system or an ink jet system. On the basis of the binary data sent from the binarization circuit D, the printer E on/off controls the dots and reproduces an image onto a recording paper.

Figure 5:
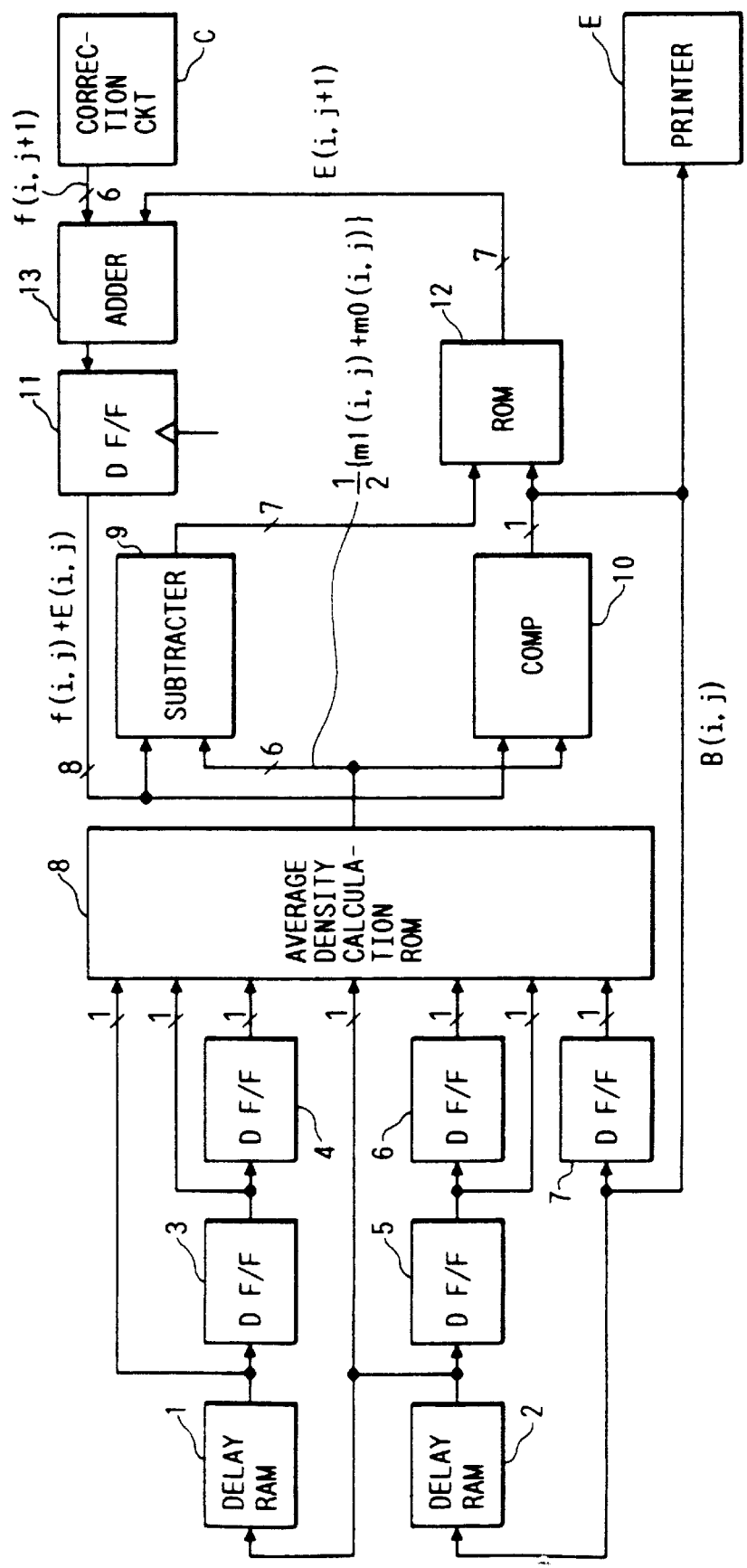
FIG. 5 is a block diagram showing the details of a binarizing circuit in the embodiment 1.

FIG. 5 is a block diagram showing the details of the binarizing circuit D in FIG. 4.

In FIG. 5, reference numerals 1 and 2 denote delay RAMs each for storing the binary data which was binarized by an amount of one line; 3 to 7 and 11 indicate D F/F (D flip-flops) each for delaying the binary data by one pixel; 8 an average density calculation ROM for calculating an average density of the pixels around the target pixel and outputting a threshold value; 9 a subtracter for calculating the difference between the multi-level data of the target pixel which was input and the threshold value; 10 a comparator for comparing the threshold value which is output from the ROM 8 with the multi-level data of the target pixel; 11 the D F/F; 12 an ROM for calculating difference data to be added to the multi-level data which is input subsequently to the target pixel; and 13 an adder for adding the input data and the difference data which is output from the ROM 12.

In the above construction, the comparator 10 outputs data B(i,j) of one-bit which was binarized on the basis of the equation ③ to the D F/F 7 and the printer E. The binary data is input to the RAMs 2 and 1 for delaying every line. The binary data B(i−1,j+1) which was delayed by one line by the RAM 2 and the binary data B(i−2,j+1) which was delayed by two lines by the RAM 1 are output to the ROM 8.

Further, the D F/F 3 outputs the binary data B(i−2,j) to the ROM 8; the D F/F 4 outputs the B(i−2, j−1); the D F/F 5 outputs the B(i−1,j); D F/F 6 outputs the B(i−1,j−1); and the D F/F 7 outputs the B(i,j−1), respectively, to the ROM 8.

As shown in FIG. 1, the binary data relates to binary images of the peripheral pixel for the input image f(i,j). If the binary images are connected to input addresses in the ROM 8, the binary threshold value can be obtained at a high speed because the binary threshold value $(m_1(i,j)+m_0(i,j))/2$ shown in the equation ③ has previously been stored in the ROM 8 on the basis of the equations ① and ②.

The binary threshold value is input to the subtracter 9 and comparator 10. On the other hand, f(i,j)+E(i,j) is input from the D F/F 11 to the subtracter 9 and comparator 10.

On the basis of those two inputs, the subtracter 9 calculates the difference $$f(i,j)+E(i,j)-(m_1(i,j)+m_0(i,j))/2$$

between both sides of the inequality in the equaiton ③. The difference value is input to the ROM 12. When the above equation is modified by using the equations ① to ③, we have $$f(i,j) + E(i,j) - \left[m_1(i,j) - \frac{1}{2S}R(0,0)\right] = \quad ④$$

$$f(i,j) + E(i,j) - \left[m_0(i,j) + \frac{1}{2S}R(0,0)\right] =$$

$$\begin{cases} E(i,j+1) + \frac{1}{2S}R(0,0) & \text{(when } B(i,j)=1) \\ E(i,j+1) - \frac{1}{2S}R(0,0) & \text{(when } B(i,j)=0) \end{cases}$$

On the other hand, on the basis of the above two inputs, the comparator 10 compares f(i,j)+E(i,j) and $(m_1(i,j)+m_0(i,j))/2$ and outputs the binary data B(i,j).

That is, in the ROM 12, the E(i,j+1) shown in the equation (4) is calculated on the basis of the value of B(i,j) from the comparator 10 and $f(i,j)+E(i,j)-(m_1(i,j)+m_0(i,j))/2$ from the subtracter 9.

In the above equation (4), since the weight R(0,0) and S have already been known, by previously calculating the difference E(i, j+1) from the average density value, if the binary data B(i,j) and $f(i,j)+E(i,j)-(m_1(i,j)+m_0(i,j))/2$ as the output of the subtracter 9 are input to the ROM 12, E(i,j+1) can be obtained by the table conversion.

FIG. 6 shows an example of the table stored in the ROM 12.

Figure 3:
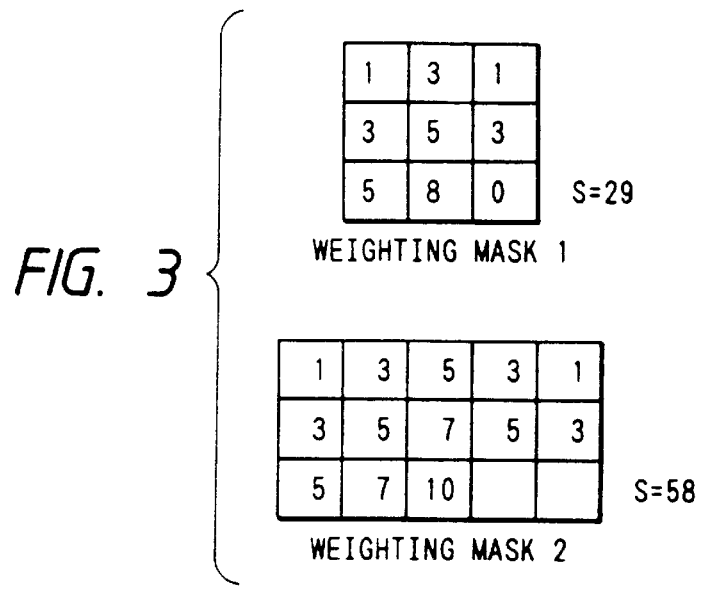
Figure 7:
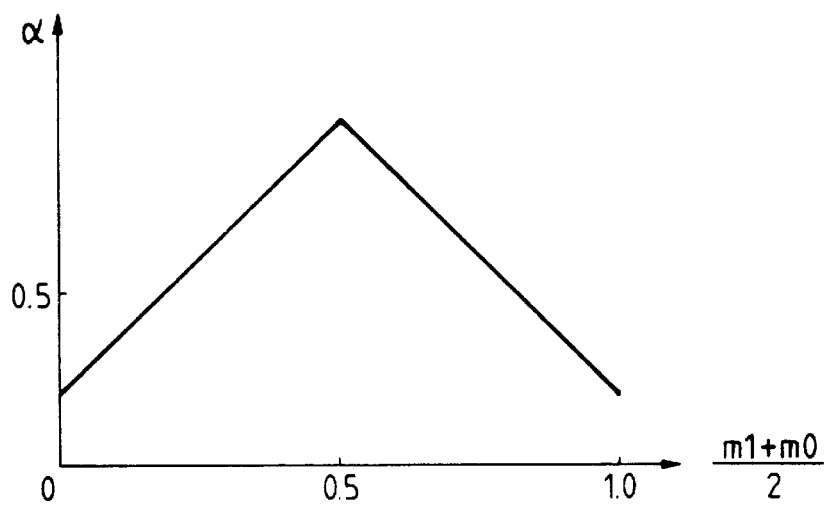
FIG. 7 is a diagram showing the case where a weighting mask 1 was converted into 6-bit data.

In the embodiment, since the weight mask 1 shown in FIG. 3 has been used, in order to normalize to the 6-bit image density levels (0 to 63) which are actually input, the values obtained by the equations ① and ② are increased by 63 times and the resultant value is stored as the value which was converted into the 6-bit value into the average density calculation ROM table. In this case, the weight mask 1 is set as shown in FIG. 7.

The output $$f(i,j)+E(i,j)-(m_1(i,j)+m_0(i,j))/2$$

of the subtracter 9 is input as an absolute value into the ROM 12 and the positive/negative sign is determined in accordance with the value of B(i,j). The difference E(i,j+1) obtained by the ROM 12 is added to the input image data f(i,j+1) by the adder 13. The D F/F 11 delays the addition value by a period of time of the data of one clock.

As mentioned above, the embodiment can be easily realized by merely adding calculation ICs of a few chips as compared with the average density approximating method. Moreover, the gradations can be extremely improved.

As mentioned above, according to the above first embodiment, the average density is calculated on the basis of the binary data and the binarization is executed on the basis of the average density. Thus, a processing amount for binarization can be fairly reduced. In addition, the gradations can be remarkably improved by correcting the difference between the average density which is generated upon binarization and the input multi-level data.

In the embodiment, the binary difference E has been distributed to only the next pixel and corrected in the equation ③. However, if the binary difference E is distributed to a plurality of pixels in a manner such that 3E(i,j+1)/4 is distributed to the pixel (i,j+1) and E(i,j+1)/4 is distributed to the pixel (i,j+2) in FIG. 1, even if the average processing mask is small, the gradation reproducing capability is improved.

The binary difference E can be also two-dimensionally distributed to a plurality of pixels near the target pixel at a predetermined distribution ratio. In this case, although a hardware construction is slightly complicated, the uniform image can be also obtained with respect to the sub scanning direction as well as in the main scanning direction and the reproducibility is improved.

In the case of two-dimensionally distributing the binary difference E in two directions (one adjacent pixel and one pixel existing under the target pixel by one line), the equation ③ is as follows.

$$\begin{aligned} &\text{When } f(i,j)+E(i,j) > \{m_1(i,j)+m_0(i,j)\}/2 \quad ③' \\ &\quad B(i,j)=1 \\ &E_1(i,j+1) = \frac{1}{2}[f(i,j)+E(i,j)-m_1(i,j)] \\ &E_2(i+1,j) = \frac{1}{2}[f(i,j)+E(i,j)-m_1(i,j)] \\ &\text{When } f(i,j)+E(i,j) \le \{m_1(i,j)+m_0(i,j)\}/2 \\ &\quad B(i,j)=0 \\ &E_1(i,j+1) = \frac{1}{2}[f(i,j)+E(i,j)-m_0(i,j)] \\ &E_2(i+1,j) = \frac{1}{2}[f(i,j)+E(i,j)-m_0(i,j)] \\ &\text{where, } E(i,j) = E_1(i,j) + E_2(i,j) \end{aligned}$$

The difference transfer pixels are set to two pixel positions which are neighboring to the target pixel in two orthogonal directions, that is, two points of (i,j+1) and (i+1,j). The difference value [f(i,j) E(i,j)−m (i,j)] which is obtained in the embodiment is divided into two values of $E_1(i,j+1)$ and $E_2(i+1,j)$ and they are respectively added to the input density value, thereby executing the correction.

Figure 8:
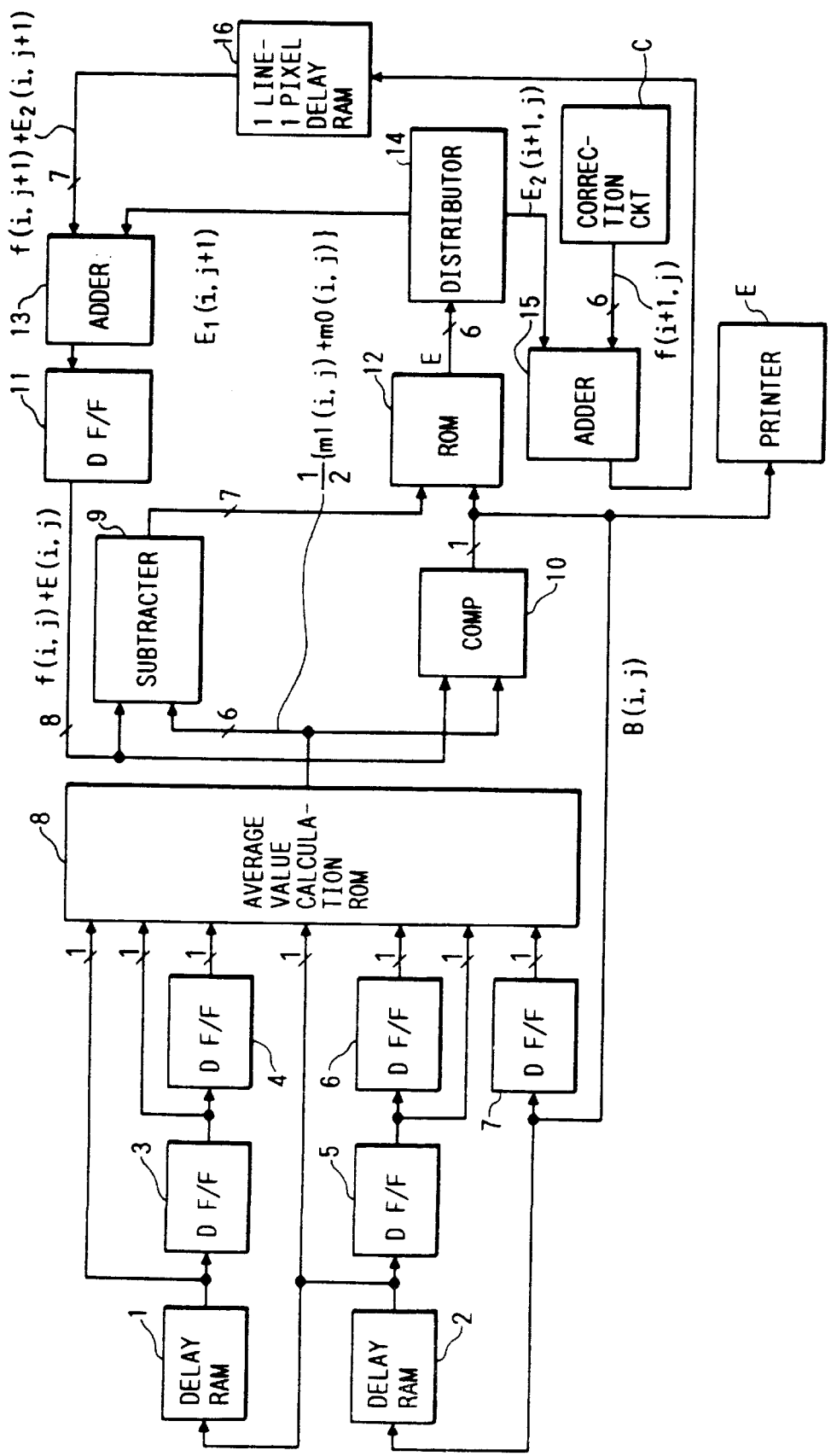
FIGS. 8, 9, and 10 are block diagrams of binarizing circuits of embodiments in the case where the binarizing circuit of FIG. 5 is partially modified.

FIG. 8 is a block diagram of a binarizing circuit in the case of two-dimensionally distributing the binary difference E. In FIG. 8, the same parts and elements as those in FIG. 5 are designated by the same reference numerals and their descriptions are omitted.

Reference numeral 14 denotes a distributor for distributing the binary difference E which was sent from the ROM 12 into the half portions in order to distribute them to the $f(i,j+1)$ pixel and $f(i+1,j)$ pixel.

Reference numeral 15 indicates an adder for adding $f(i+1,j)$ sent from the correction circuit C and $E_2(i+1,j)$ sent from the distributor 14.

Reference numeral 16 represents an RAM for delaying the data sent from the adder 15 by a period of time corresponding to one line—one pixel. By providing the RAM 16, the difference generated at the previous line can be added to the target pixel $f(i,j)$.

As mentioned above, by two-dimensionally distributing the difference between the average density which is generated upon binarization and the input density, the regularity can be lightened as compared with the case of distributing the difference to one adjacent pixel and the generation of a periodic pattern can be prevented. On the other hand, even when an edge portion of a character, a diagram, or the like is reproduced, the directivity does not appear and the edge portion can be clearly reproduced.

In the above embodiment, the weighting mask 1 shown in FIG. 3 has been used as a weighting mask to obtain the average density. However, by enlarging a region to obtain the average density like a weighting mask 2, the reproducibility of the gradations can be also further improved and the reproducibility of the resolution information which is required in a character original or the like is also improved. The weighting mask is not limited to the above masks, but any mask of a similar form can be also used.

On the other hand, although the weighting mask has been set to increase as the pixel to be processed is near the target pixel, its gradient and distribution are not limited. Pixels at discrete positions which are not neighboring can be also used.

In the embodiment, when the difference which is distributed to peripheral pixels is obtained by the error diffusion method, the inevitably dividing process is unnecessary. The difference generated in such a case is eliminated and the densities of the input image and output image can be completely preserved.

Embodiment 2

In the embodiment 1, the value which was corrected by adding the difference $E(i,j)$ generated when the previous pixel $(i,j-1)$ of the target pixel $(i,j)$ is binarized to $f(i,j)$ of the target pixel is compared with the average density, thereby executing the binarization. However, in the embodiment, the difference $E(i,j)$ is corrected upon calculation of the average value when the target pixel is binarized, thereby executing the binarization.

That is, in the embodiment 2, $m_1(i,j)$ and $m_0(i,j)$ obtained by the equations ① and ② in the embodiment 1 are set as follows.

$$m_1'(i,j) = \frac{1}{S}\sum_{x=0}^{2}\sum_{y=-1}^{1} R(x,y) \cdot B(i-x, j-y) - E(i,j) \quad \text{⑤}$$

(where, $B(i,j) = 1$)

$$m_0'(i,j) = \frac{1}{S}\sum_{x=0}^{2}\sum_{y=-1}^{1} R(x,y) \cdot B(i-x, j-y) - E(i,j) \quad \text{⑥}$$

(where, $B(i,j) = 0$)

The multi-level density $f(i,j)$ of the target pixel is binarized by the following equations.

$$\left. \begin{array}{l} \text{When } f(i,j) > (m_1'(i,j) + m_0'(i,j))/2, \\ \quad B(i,j) = 1, \\ E(i, j+1) = f(i,j) + E(i,j) - m_1'(i,j) \\ \text{When } f(i,j) \leq (m_1'(i,j) + m_0'(i,j))/2 \\ \quad B(i,j) = 0, \\ E(i, j+1) = f(i,j) + E(i,j) - m_0'(i,j) \end{array} \right\} \quad \text{⑦}$$

Figure 9:
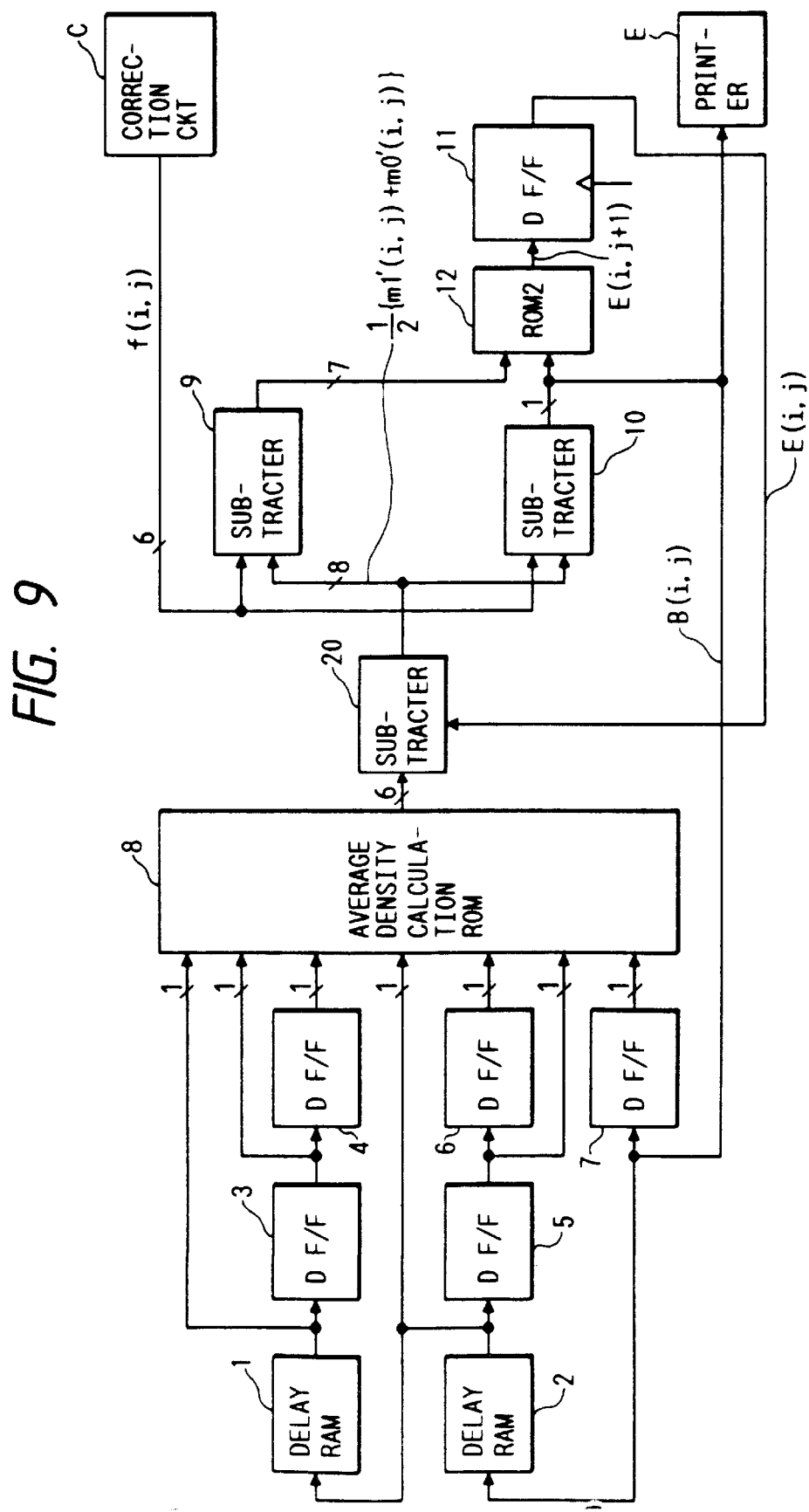

FIG. 9 is a block diagram of an image processing apparatus which realizes the embodiment 2.

In FIG. 9, reference numerals 1 to 12 indicate the same component elements as those in the embodiment 1 and their descriptions are omitted. Reference numeral 20 denotes a subtracter to subtract the difference $E(i,j)$ generated at the previous pixel from the average density value sent form the average density calculation ROM 8. In the above construction, the threshold value $(m_1'(i,j) + m_0'(i,j))/2$ obtained by correcting the binary difference E by the subtracter 20 for the average density which was output from the ROM 8 is input to the subtracter 9 and comparator 10. On the other hand, the multi-level data $f(i,j)$ of the input image is input to the subtracter 9 and comparator 10.

On the basis of those two inputs, the subtracter 9 calculates the difference $$f(i,j) - (m_1'(i,j) + m_0'(i,j))/2$$

between both sides of the inequality in the equation ⑦. When the above equation is modified by using the equations ⑤ and ⑥, we have $$f(i,j) - \left[m_1'(i,j) - \frac{1}{2S}R(0,0)\right] = f(i,j) - \left[m_0'(i,j) + \frac{1}{2S}R(0,0)\right] = \quad \text{⑧}$$

$$\left. \begin{array}{l} E(i, j+1) + \frac{1}{2S}R(0,0) \quad (\text{when } B(i,j) = 1) \\ E(i, j+1) - \frac{1}{2S}R(0,0) \quad (\text{when } B(i,j) = 0) \end{array} \right\}$$

On the other hand, the comparator 10 compares $f(i,j)$ with $(m_1'(i,j) + m_0'(i,j))/2$ and outputs the binary data $B(i,j)$.

In the above equation ⑧, since the weight $R(0,0)$ and $S$ have already been known, the binary difference $E(i,j+1)$ is derived by the ROM 12. The difference $E(i,j+1)$ is delayed by the D F/F 11 and is input to the subtracter 20. By repeating the above processes, the input multi-level data can be sequentially binarized. Although the embodiments 1 and 2 have been described with respect to the example in which the input ulti-level data is digitized into the binary data, the invention can be also applied in the case of digitizing into 3-value data or 4-value data.

Although the embodiments have been described with respect to the case where the number of kinds of the input data is set to one (one color), by setting the input data to three colors of R, G, and B, the invention can be also applied to a color image.

Embodiment 3

A modified example of the embodiment 1 will now be described as an embodiment 3.

In the embodiment 3, when the data (f(i,j)+E(i,j)) (FIG. 2) in which the difference was corrected as described in the embodiment 1 lies within a predetermined range, the difference E(i,j+1) is corrected in a manner such that E(i,j+1)= f(i,j)+E(i,j)−m₀(i,j)). That is, when the difference E(i,j+1) upon binarization of the next pixel is $$\left.\begin{array}{c} f(i,j) + E(i,j) - m_0(i,j) < \alpha \times R(0,0) \\ (\alpha \text{ is a constant}) \\ \text{or} \\ f(i,j) + E(i,j) - m_1(i,j) > \alpha \times R(0,0) \\ (\alpha \text{ is a constant}) \\ E(i,j+1) = 0 \text{ is set.} \end{array}\right\} \quad \text{⑨}$$

In the cases other than the above case, $$\left.\begin{array}{c} E(i,j+1) = f(i,j) + E(i,j) - m_1(i,j) \\ (\text{when } B(i,j) = 1) \\ \text{or} \\ E(i,j+1) = f(i,j) + E(i,j) - m_0(i,j) \\ (\text{when } B(i,j) = 0) \end{array}\right\} \quad \text{⑩}$$

That is, the characteristic processes of the present system are as follows. As shown in the equations ⑨ and ⑩, in the comparison of the target pixel correction values and the average values $m_1$ and $m_0$ upon binarization, if the target pixel correction value lies within a predetermined (according to the value of α) region (namely, the difference E(i,j+1) lies within a predetermined region) in which it has a value near the selected average value $m_1$ or $m_0$, the difference between the selected average value and the target pixel correction value is assigned as the correction value upon binarization of the next pixel in accordance with the equation ⑩. On the other hand, when such a difference is out of the predetermined region, that is, when the difference between the target pixel correction values $m_1$ and $m_0$ is sufficiently large, the correction value is set to 0 and the correction upon binarization of the next pixel is not executed.

In other words, in the former case, the density change of the image near the target pixel is small, so that it is determined such that the image relates to the image area having a half tone. Therefore, the difference between the image density and the average density value generated by binarizing is corrected by the next pixel, thereby enabling the gentle density change of the image to be false half-tone processed with a high fidelity. Namely, the gradations can be improved. On the other hand, in the latter case, it is determined that the edge portion of a character, a diagram, or the like, namely, the target pixel density contrarily suddenly changes as compared with the density of the image near the target pixel. Therefore, the correction value is set to 0 for the pixel in such a case and the deterioration in resolution due to the preservation of the density is suppressed, thereby binarizing and reproducing. Due to this, the resolution in the edge portion can be improved.

As mentioned above, according to the characteristic processing system of the third embodiment, in the half-tone image region, the density is preserved on the binary image by using the binary difference in accordance with the image density change and in a resolution image portion of a character or the like, in order to prevent the fading of the image due to the preservation of the density, the binary difference is not corrected but is approximated to the average density values $m_1$ and $m_0$.

Since the schematic circuit construction of the embodiment 3 is similar to that shown in FIG. 4, its description is omitted.

Figure 10:
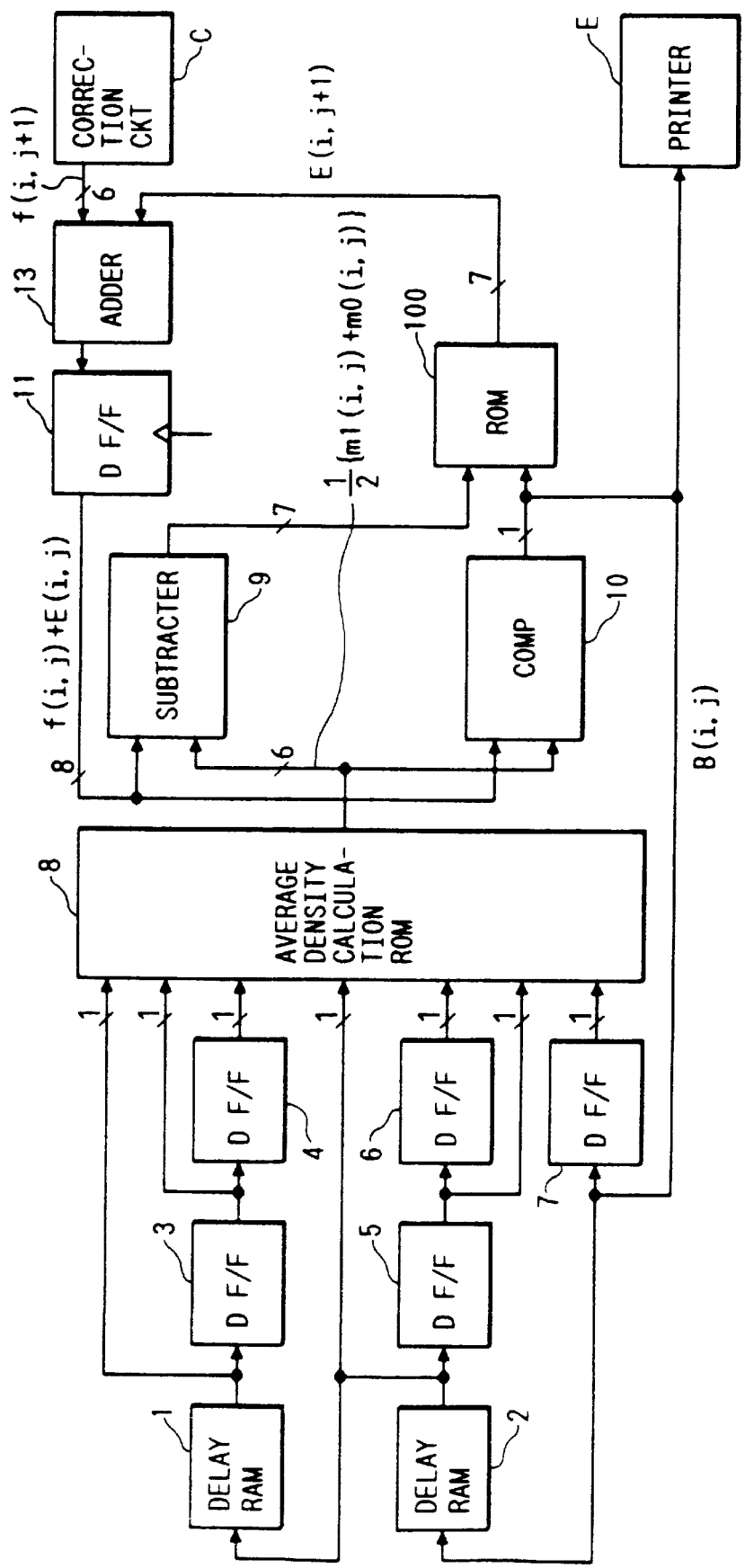

FIG. 10 is a block diagram showing the details of the binarizing circuit D in the embodiment 3.

In the diagram, the same parts and components as those in FIG. 5 are designated by the same reference numerals.

In FIG. 10, reference numerals 1 and 2 denote the delay RAMs each for storing the binarized binary data by an amount corresponding to one line; 3 to 7 and 11 indicate the D F/F (D flip-flops) each for delaying the binary data by a period of time corresponding to one line; 8 the average density calculation ROM for calculating the average densities of the pixels around a target pixel and for outputting a threshold value; 9 a subtracter for calculating the difference between the input multi-level data of the target pixel and the threshold value; 10 the comparator for comparing the threshold value which is output from the ROM 8 with the multi-level data of the target pixel; 11 the D F/F; 100 an ROM for calculating difference data to be added to the multi-level data which is input next to the target pixel; and 13 the adder for adding the input data and the difference data which is output from the ROM 100.

In the above construction, the comparator 10 outputs the data B(i,j) of one-bit which was binarized on the basis of the equation ③ to the D F/F 7 and the printer E. The binary data is input to the RAMs 2 and 1 each for delaying every line. The binary data B(i−1, j+1) which was delayed by one line by the RAM 2 is output to the ROM 8. The binary data B(i−2, j+1) which was delayed by two lines by the RAM 1 is output to the ROM 8.

Further, the D F/F 3 outputs the B(i−2,j), the D F/F 4 outputs the B(i−2,j−1), the D F/F 5 outputs the B(i−1,j), the D F/F 6 outputs the B(i−1,j−1), and the D F/F 7 outputs the B(i,j−1), respectively, to the ROM 8.

For the input image f(i,j), the binary data relates to the binary images of the peripheral pixels as shown in FIG. 1. If the binary images are connected to input addresses in the ROM 8, the binary threshold value can be obtained at a high speed because the binary threshold value $(m_1(i,j)+m_0(i,j))/2$ shown in the equation ③ has previously been stored in the ROM 8 on the basis of the equations ① and ②.

The threshold value is input to the subtracter 9 and comparator 10. On the other hand, f(i,j)+E(i,j) is input from the D F/F 11 to the subtracter 9 and comparator 10.

On the basis of those two inputs, the subtracter 9 calculates the difference $$f(i,j)+E(i,j)-(m_1(i,j)+m_0(i,j))/2$$

between both sides of the inequality in the equation ③. When the above equation is modified by using the equations ① and ②, we have $$f(i,j) + E(i,j) - \left[m_1(i,j) - \frac{1}{2S}R(0,0)\right] = \quad \text{⑪}$$

$$f(i,j) + E(i,j) - \left[m_0(i,j) + \frac{1}{2S}R(0,0)\right] =$$

-continued $$\begin{cases} E(i, j+1) + \dfrac{1}{2S} R(0,0) & \text{(when } B(i,j) = 1\text{)} \\ E(i, j+1) - \dfrac{1}{2S} R(0,0) & \text{(when } B(i,j) = 0\text{)} \end{cases}$$

On the other hand, on the basis of the above two inputs, the comparator 10 compares f(i,j)+E(i,j) and (m₁(i,j)+m₀(i,j))/2 and outputs the binary data B(i,j).

That is, in the ROM 100, the E(i,j+1) shown in the equation ⑨ or ⑩ is calculated on the basis of the value of B(i,j) from the comparator 10 and f(i,j)+E(i,j)−(m₁(i,j)+M₀(i,j))/2 from the subtracter 0.

In the equation ⑪, since the weight R(0,0) and S have already been known, the binary difference E(i,j+1) according to the equations ④ and ⑤ is previously calculated and stored into the difference calculation ROM 100. Due to this, the E(i,j+1) is obtained by the table conversion by inputting the binary data B(i,j) and $$f(i,j)+E(i,j)-(m_1(i,j)+m_0(i,j))/2$$

as an output of the subtracter 9 into the ROM 12.

FIG. 11 shows an example of the table stored in the ROM 100.

In the embodiment, the weight mask 1 shown in FIG. 3 has been used. Therefore, in order to normalize to the image density levels (0 to 63) of six bits which are actually input, the value obtained by the equations ① and ② is increased by 63 times and the resultant values are stored into the average density calculation ROM table as the values which were converted into 6-bit values. In this case, the weight mask 1 is set as shown in FIG. 7.

FIG. 11 shows the table in the case where α=1 in the equation ⑥. When E(i,j+1) is larger than R(0,0)=18, E(i,j+1) is set to 0.

The output f(i,j)+E(i,j)−(m₁(i,j)+m₀(i,j))/2 of the subtracter 9 is input as an absolute value into the ROM 100. The positive/negative sigh is determined in accordance with the value of B(i,j).

The difference E(i,j+1) obtained in the ROM 100 is added to the input image data f(i,j+1) by the adder 13. The D F/F 11 delays the addition value by a period of time of one clock of the data.

As mentioned above, as compared with the average density approximating method, the embodiment 3 can be easily realized by merely adding calculation ICs of a few chips.

As described above, according to the embodiment 3 of the invention, the average density is calculated on the basis of the data which has already been binarized and the binarization is executed on the basis of the average density, so that a processing amount for binarization can be remarkably reduced. Moreover, when the difference between the average density which is generated upon binarization and the input multi-level data lies within a predetermined range, the difference is corrected, so that the half-tone process having the excellent gradations can be executed.

Further, in the embodiment, when the difference between the average density and the input multi-level data is larger than the predetermined value, the difference is not corrected. Thus, the deterioration in resolution due to the preservation of the densities is prevented and the edge portion can be clearly reproduced.

In the embodiment, the binary difference E has been distributed to only the next pixel and the correction has been executed in the equation ③. However, the binary difference E can be also two-dimensionally distributed to a plurality of pixels near the target pixel at a predetermined distribution ratio. In this case, although a hardware construction is slightly complicated, the uniform image can be also obtained with respect to the sub scanning direction as well as the main scanning direction and the reproducibility is improved.

On the other hand, for instance, in FIG. 1, if the binary difference E is distributed to a plurality of pixels in a manner such that 3E(i,j+1)/4 is distributed to the pixel (i,j+1) and E(i,j+1)/4 is distributed to the pixel (i,j+2), the reproducing capability of the gradations is improved even if the average processing mask is small.

On the other hand, although the weighting mask is increased as the pixel is near the target pixel, its gradient and distribution are not limited. The pixels existing at discrete positions which are not neighboring can be also used.

On the other hand, the invention can be widely used in image processing apparatuses such as facsimile apparatus, copying machine, and the like.

Embodiment 4

In the embodiment 3, the binary difference E has been divided to the cases shown by the equations ⑨ and ⑩ and when the difference E is equal to or larger than a predetermined value using the constant α, the difference E is set to 0 and is not distributed to the next pixel. However, the value of the constant α can be also changed in accordance with the average density value or target pixel density value.

For instance, as shown in FIG. 12, if the value of α is set so as to decrease as the average density approaches 0 or 1, the edge portion of a black character in the white background, a blank character in the black background, or the like can be more finely binarized.

Embodiment 5

The following equation ⑫ is used in place of the equation ⑨ in the embodiment 3. In the case where $$\begin{cases} (m_1(i,j) + m_0(i,j))/2 < K, \text{ and} \\ m_1(i,j) < f(i,j) + E(i,j) \\ \text{or} \\ (m_1(i,j) + m_0(i,j))/2 > 1 - K, \text{ and} \\ m_0(i,j) > f(i,j) + E(i,j) \end{cases} \quad ⑫$$

Where, K is a constant and if it is set to about 0 or 1 (K=0, 1), the good result can be obtained.

According to the embodiment 5, by setting the difference E to 0 in the case where the average density value approached 0 or 1, the character portion can be highly finely binarized in a manner similar to the embodiment 2.

In the embodiments 4 and 5, as shown in FIG. 10, if the output (m₁(i,j)+m₀(i,j))/2 of the average density calculation ROM 8 is input in place of the binary data B(i,j) to an address terminal of the difference calculation ROM 100, those embodiments can be easily realized by the table converting processes based on the data which has previously been written in a manner similar to the embodiment 3.

Embodiment 6

In the embodiment 3, the weighting mask of the matrix of 3×3 shown in FIG. 3 has been used. However, generally, in order to smoothly binarize the half-tone portion, it is desirable to set the weight R(0,0) of the target pixel to a small value. In addition, as the weight R(0,0) is small for a density change of the data to be binarized, the edge portion shown by the equation ⑨ can be accurately detected. Therefore, in the case of using the weighting mask of 4×5 shown in FIG. 14, R(0,0) in FIG. 3 in the embodiment 3 is set to 8/28=0.29, while that in FIG. 13 is set to 11/96=0.11. Thus, the half-tone portion can be more smoothly binarized and the edge portion of a character portion or the like can be more finely binarized and reproduced.

In the embodiments 3 to 6, the calculation of the correction value E for preservation of all densities during the processing has been executed by using the average values $m_0$ and $m_1$. However, for instance, the discrimination or the like to see if the value of E is set to 0 or not in the edge portion or the like can be realized by a well-known technique. For example, a two-dimensional Laplacian is obtained from the image data to be binarized, this value is processed on the basis of the threshold value, the edge portion is determined on the basis of the result of the discrimination of such a threshold value processing, and E is set to 0 in the edge portion. Even by this method, the similar effect is derived. On the other hand, the edge portion is designated in a wide region on the basis of a command obtained by an area designating operation of the operator without switching the processes every pixel and E can be also set to 0 in such a region.

In the above embodiments 1 to 6, assuming that the average value when the target pixel was binarized to 0 is set to $m_1$ and the average value when the target pixel was binarized to 1 is set to mot the data of the target pixel is binarized by using $(m_1+m_0)/2$ as a threshold value.

In the embodiment which will be explained hereinlater, explanation will now be made with respect to an example in the case where the average value of the binary data (the data which has previously been binarized before the target pixel) including no target pixel is set to a threshold value and the data of the target pixel is binarized.

Embodiment 7

The principle of the above system will be first described.

FIG. 14(1) is a diagram showing a multi-level density of each pixel of the input image.

In FIG. 14(1), f(i,j) denotes multi-level density data of the input image at the position of the target pixel to be binarized and is set to a normalized value of 0 to 1. On the other hand, the binarization has already been finished at the pixel positions above a broken line. After the target pixel was binarized, the similar binarization is sequentially executed in a manner such that f(i,j+1), f(i,j+2), . . .

FIG. 14(2) is a diagram showing binary image data. B(i,j) shows the density (having the value of 0 or 1) after the target pixel was binarized. The portion surrounded by a broken line denote the pixel data which has already been binarized upon processing of the target pixel. Those pixel data are used to binarize the target pixel.

FIG. 14(3) is a diagram showing weighting masks. R denotes an example of the weighting mask to obtain the average density and is expressed by a matrix of a size of 3×3. The weight R(0,0) for the pixels which are not binarized yet is used by setting such that R(0,0)=R(0,−1)=0.

In the system, the weighted average density of the binary images near the target pixel is set to m(i,j) and is obtained by the following equation.

$$m(i, j) = \sum_{x=0}^{2} \sum_{y=-1}^{1} R(x, y) \cdot B(i-x, j-y) \quad (13)$$

The target pixel f(i,j) is binarized by using the average density m(i,j) and the binary correction value E(i,j) which has already been assigned in accordance with the following equation.

$$\begin{aligned}
&\text{When } f(i, j) + E(i, j) > m(i, j), \\
&\quad B(i, j) = 1 \\
&E(i, j+1) = f(i, j) + E(i, j) - m(i, j) \\
&\text{When } f(i, j) + E(i, j) \leq m(i, j), \\
&\quad B(i, j) = 0 \\
&E(i, j+1) = f(i, j) + E(i, j) - m(i, j) \\
&\text{However, when } f(i, j) + E(i, j) = m(i, j) = 1, \\
&\quad B(i, j) = 1
\end{aligned} \quad (14)$$

Figure 15:
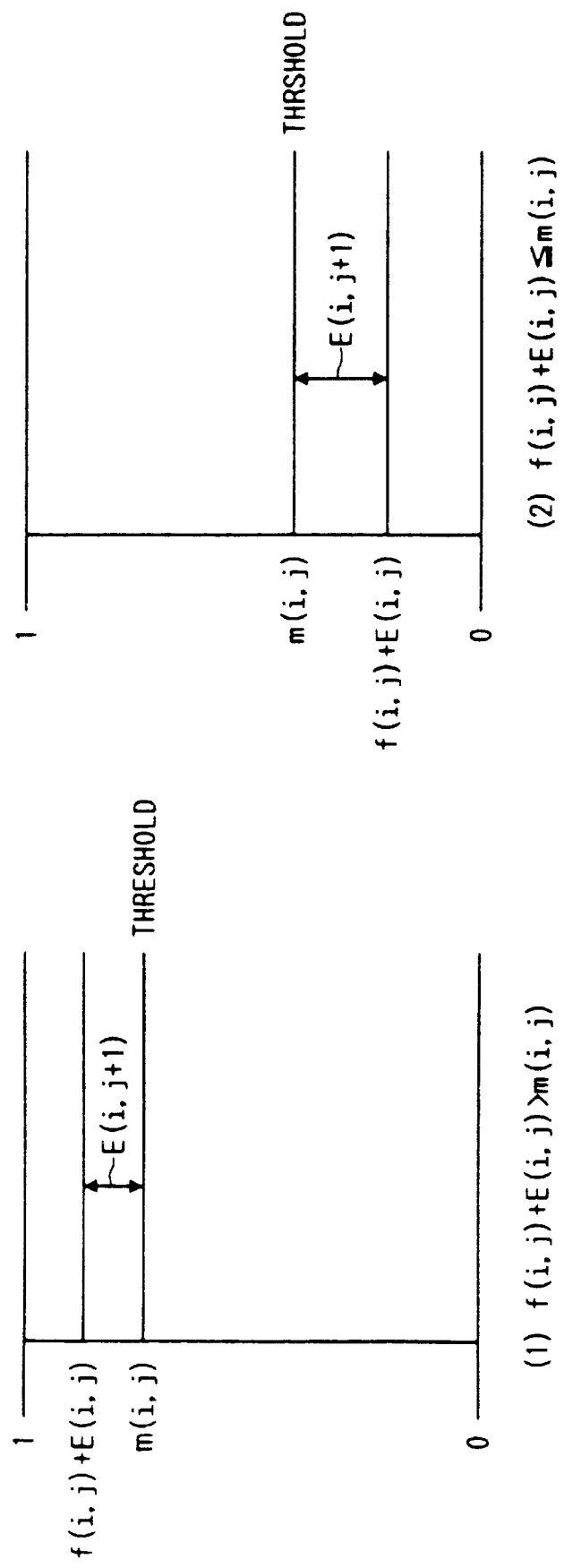

FIG. 15 is a diagram showing the equation (14).

In the equation (14), E(i,j) denotes a difference which is generated when the multi-level density f(i,j−1) of the pixel which is precedent to the target pixel (i,j) by one pixel, that is, of the pixel (i,j−1) was binarized to the binary density B(i,j−1). Namely, E(i,j) corresponds to the difference value between the multi-level density f(i,j−1) and the average density m(i,j−1) of the pixel near the target pixel. By binarizing the corrected value which is obtained by adding the binary difference E(i,j) to the target pixel f(i,j), the image density after completion of the binarization can be completely preserved as an average density in the whole input image region.

By executing the processes in consideration of the binary difference, the reproducing capability of the half tone is remarkably improved as compared with that in the average density approximating method.

On the other hand, in the equation (14), E(i,j+1) denotes a difference which is distributed to the pixel f(i,j+1) which is located behind the target pixel (i,j) by one pixel.

The reason why in spite of the fact that a processing amount in the binarization system in the embodiment is extremely smaller than that in the error diffusion method, the image reproducing capability which is equal to or higher than that in the error diffusion method is obtained is because in spite of the fact that the difference is merely corrected by one adjacent pixel, by obtaining the average density by using a plurality of data after completion of the binarization, the effect similar to that in the case of distributing the difference to a plurality of pixels and correcting is equivalently obtained.

Since a schematic circuit construction in the embodiment is similar to that shown in FIG. 4, its description is omitted.

Figure 16:
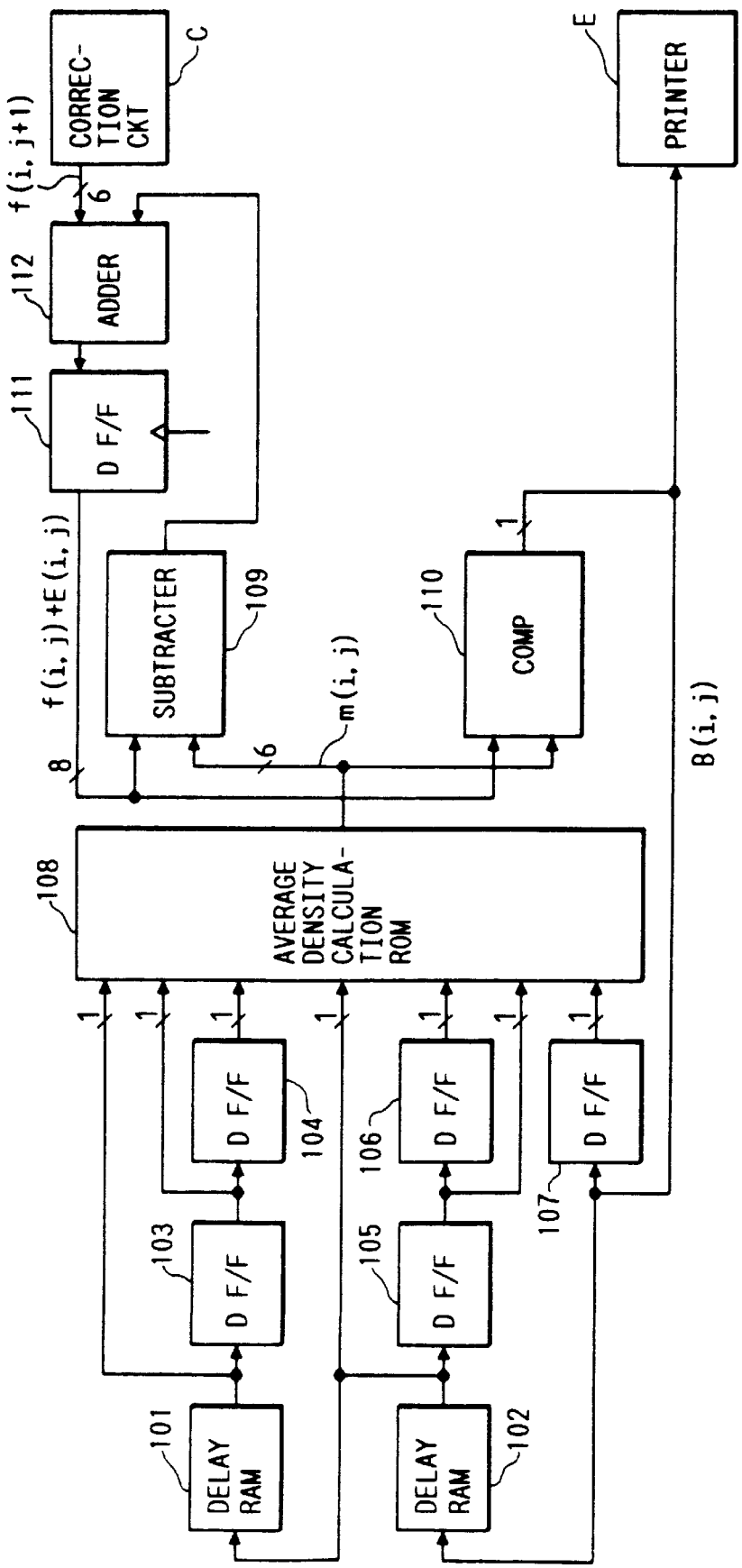
FIGS. 16 and 18 are block diagrams showing the details of the binarizing circuit in the embodiment 7.

FIG. 16 is a block diagram showing the details of the binarizing circuit D in the embodiment 7.

In FIG. 16, reference numerals 101 and 102 denote delay RAMs each for storing the binarized data by an amount of one line; 103 to 107 and 111 indicate D F/F (D flip-flops) each for delaying the binary data by a period of time of one pixel; 108 an average density calculation ROM for calculating the average density of a predetermined region from the binary data of the pixels around the target pixel and for outputting the average density as a threshold value when the data of the target pixel is binarized; 109 a subtracter for calculating the difference between the input multi-level data of the target pixel and the threshold value which is output from the ROM 108; 110 a comparator for comparing the threshold value which is output from the ROM 108 with the multi-level data of the target pixel; and 112 an adder for adding the difference data which is output from the subtracter 109 and the 6-bit multi-level data sent from the correction circuit.

In the above construction, the comparator 110 outputs the 1-bit data B(i,j) which was binarized on the basis of the equation (14). The binary data is input to the RAMs 102 and 101 for delaying it every line. The binary data B(i−1,j+1) which was delayed by one line by the RAM 102 is output to the ROM 108.

The binary data B(i−2,j+1) which was delayed by two lines by the RAM 101 is output to the ROM 108.

Further, the D F/F 103 outputs the B(i−2,j), the D F/F 104 outputs the B(i−2,j−1), the D F/F 105 outputs the B(i−1,j), the D F/F 106 outputs the B(i−1,j−1), and the D F/F 107 outputs the B(i,j−1), respectively, to the ROM 108.

The binary data denote the binary images of the peripheral pixels for the input image f(i,j) as shown in FIG. 14. By connecting the binary images to input addresses in the ROM 108, the binarization threshold value can be obtained at a high speed because the binarization threshold value m(i,j) shown in the equation (14) has previously been stored in the ROM 108 on the basis of the equation (13).

The threshold value is input to the subtracter 109 and comparator 110. On the other hand, f(i,j)+E(i,j) is input from the D F/F 111 to the subtracter 109 and comparator 110.

On the basis of those two inputs, the subtracter 109 calculates the difference $$f(i,j)+E(i,j)-m(i,j) \quad (15)$$

between both sides of the inequality in the equation (14), that is, the difference between the average density value m(i,j) and the input data.

On the other hand, the comparator 110 compares f(i,j)+E(i,j) and m(i,j) on the basis of the two inputs and outputs the binary data B(i,j). On the other hand, on the basis of the equation (15), the difference E(i,j+1) which is output from the subtracter 109 is added to the input image data f(i,j+1) by the adder 112. The D F/F 111 delays the addition value by a period of time of one clock of the data.

Figures 17A, 17B, 20:
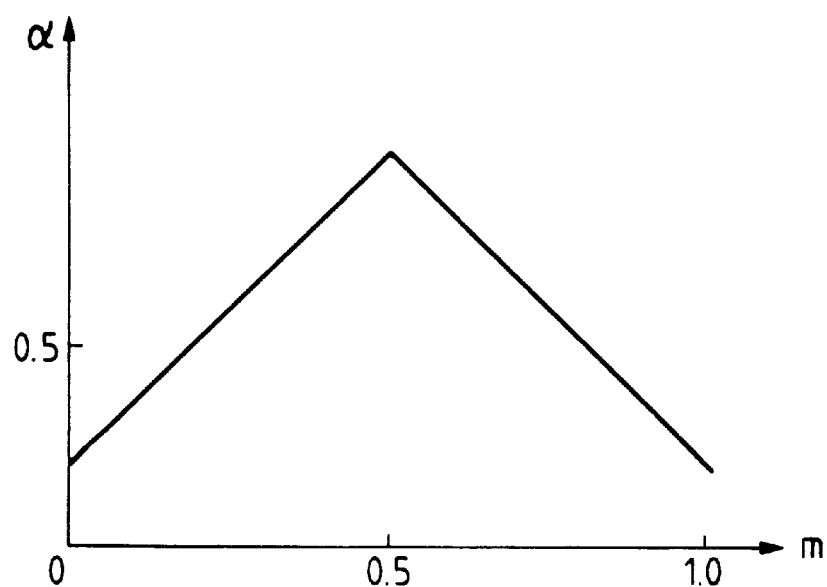

FIG. 17 shows examples of the weighting masks. The weighting mask of FIG. 17A is used to obtain the average value from the binary data of seven pixels. The weighting mask of FIG. 17B is used to obtain the average value from the binary data of twelve pixels. In the embodiment, since the weighting mask shown in FIG. 17A is used, in order to normalize to the image density levels (0 to 63) of six bits which are actually input, the values obtained by the equation (13) are increased by 63 times and the resultant values are stored into the average density calculation ROM table as the values which were converted into the 6-bit values.

As described above, according to the embodiment 7, the average density is calcualted by using only the binary data which was binarized and the input multi-level data is binarized by using the average density as a threshold value. Therefore, a processing amount for binarization can be reduced as compared with that in the average density approximating method. Moreover, since the difference between the input multi-level data and the average density which is generated when the input multi-level data was binarized is corrected the gradations can be extremely improved.

In the embodiment, although the binary difference E has been distributed to only the next pixel and corrected, if the binary difference E is distributed to a plurality of pixels in the main scanning direction in a manner such that, for instance, in FIG. 14, 3E(i,j+1)/4 is distributed to the pixel (i,j+1) and E(i,j+1)/4 is distributed to the pixel (i,j+2), the reproducing capability of the gradations is improved even when the average processing mask is small.

On the other hand, the binary difference E can be also two-dimensionally distributed to a plurality of pixels near the target pixel at a predetermined distribution ratio in a manner similar to the case of the error diffusion method. In this case, although a hardware construction is slightly complicated, the uniform image can be obtained in the sub scanning direction as well as the main scanning direction and the reproducibility is improved.

On the other hand, although the weighting mask has been increased as the pixel is close to the target pixel, its gradient and distribution are not limited. The pixels at the discrete positions which are not neighboring can be also used.

In the embodiment 7, the weighting mask of a matrix of 3×3 such as shown in an example of FIG. 17A has been used. However, generally, in order to smoothly binarize the half-tone portion, it is desirable to set the weight of the pixel adjacent to the target pixel to a small value.

Therefore, in the case of using the weighting matrix of a matrix of 3×5 shown in FIG. 17B, R(i−1,j) and R(i,j−1) are set to 7/48=0.15 as compared with 5/21=0.24 in the matrix of FIG. 17A, so that the half-tone portion can be smoothly binarized and reproduced.

In the embodiment, the calculation of the average density m has easily been realized by the ROM table. However, such a calculation can be also realized even by using seven AND gates and a plurality of adders. In this case, the processing speed can be further made high. On the other hand, by assembling such a processing circuit into a gate array or the like, a hardware scale can be remarkably reduced.

Figure 18:
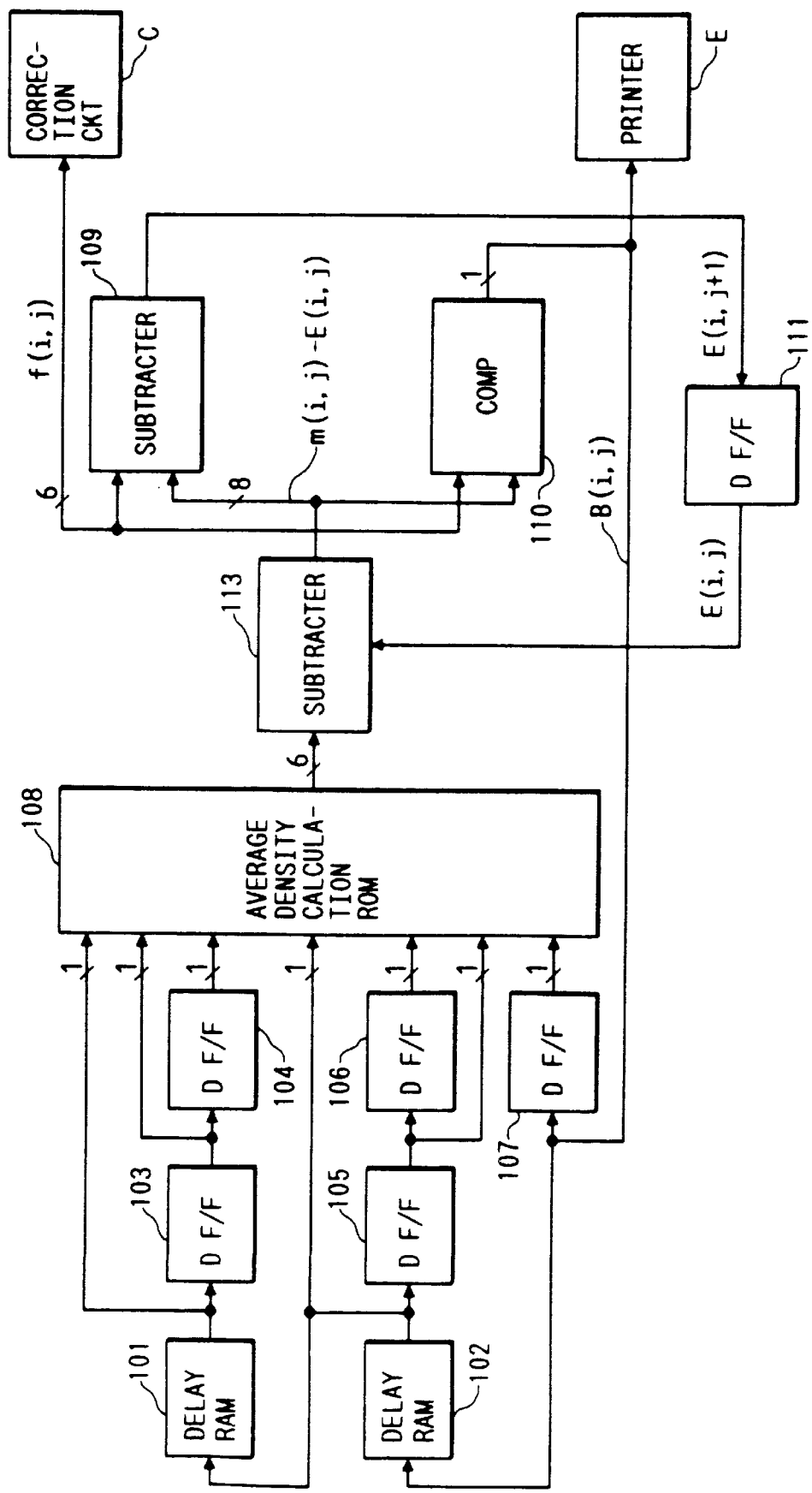

In the embodiment, the correction has been performed by directly adding the binary difference E(i,j) to the target pixel density f(i,j). However, as shown in FIG. 18, even when the difference E(i,j) is corrected by subtracting it from the average density by using a subtracter 113, the similar effect can be also obtained.

Embodiment 9

The embodiment 8 relates to a partially modified form of the embodiment 7.

That is, in the embodiment 8, the difference E(i,j+1) when the next pixel is binarized is expressed by the following equation. In the case where $$\left.\begin{array}{c} |f(i,j)+E(i,j)-m(i,j)| > \alpha, \\ (\alpha \text{ is a constant}) \\ E(i,j+1)=0 \end{array}\right\} \quad (16)$$

In the cases other than the above case, $$E(i,j+1)=f(i,j)+E(i,j)-m(i,j) \quad (17)$$

Therefore, as shown in the equations (16) and (17), in the comparison between the average density m upon binarization and the corrected target pixel density in which the difference was corrected, if the corrected target pixel density lies within a predetermined range of a value near the average density m (that is, when the difference between the average density m and the corrected target pixel density lies within a predetermined range), the difference between the corrected target pixel density and the average density is assigned as a correction value when the next pixel is binarized in accordance with the equation (17). On the other hand, if it is out of the predetermined range, that is, when the difference between the corrected target pixel density and the average density is sufficiently large, the correction value is set to 0 and the correction upon binarization of the next pixel is not executed. Namely, in the case of correcting the difference, the density change of the image near the target pixel is small, so that it is determined that such an image is in the image area having a half-tone. Therefore, the difference between the image density and the average density which occurs due to the binarization is corrected by the next pixel, so that the gentle density change of the image can be false half-tone processed with a high fidelity. That is, the gradations can be improved. On the other hand, in the case where the difference is not corrected, the edge portion in a character, a diagram, or the like, that is, the target pixel is contrarily determined to be suddenly changed as compared with the density of the image near the target pixel. Thus, the correction value is set to 0 for the pixel in such a case and the deterioration in resolutionor the pixel in such a case and the deterioration in resolution due to the preservation of the density, is suppressed, thereby binarizing and reproducing. Consequently, the resolution in the edge portion can be improved.

As mentioned above, according to the characteristic processing system of the embodiment 8, in the half-tone image area, the density is preserved on the binary image by using the binary difference in accordance with the image density change. In the resolution image portion such as a character or the like, in order to prevent the fading of the image due to the preservation of the density, the correction of the binary difference is not executed by the density is approximated to the average density m.

Since a schematic circuit construction in the embodiment 8 is similar to that shown in FIG. 4, its description is omitted.

Figure 19:
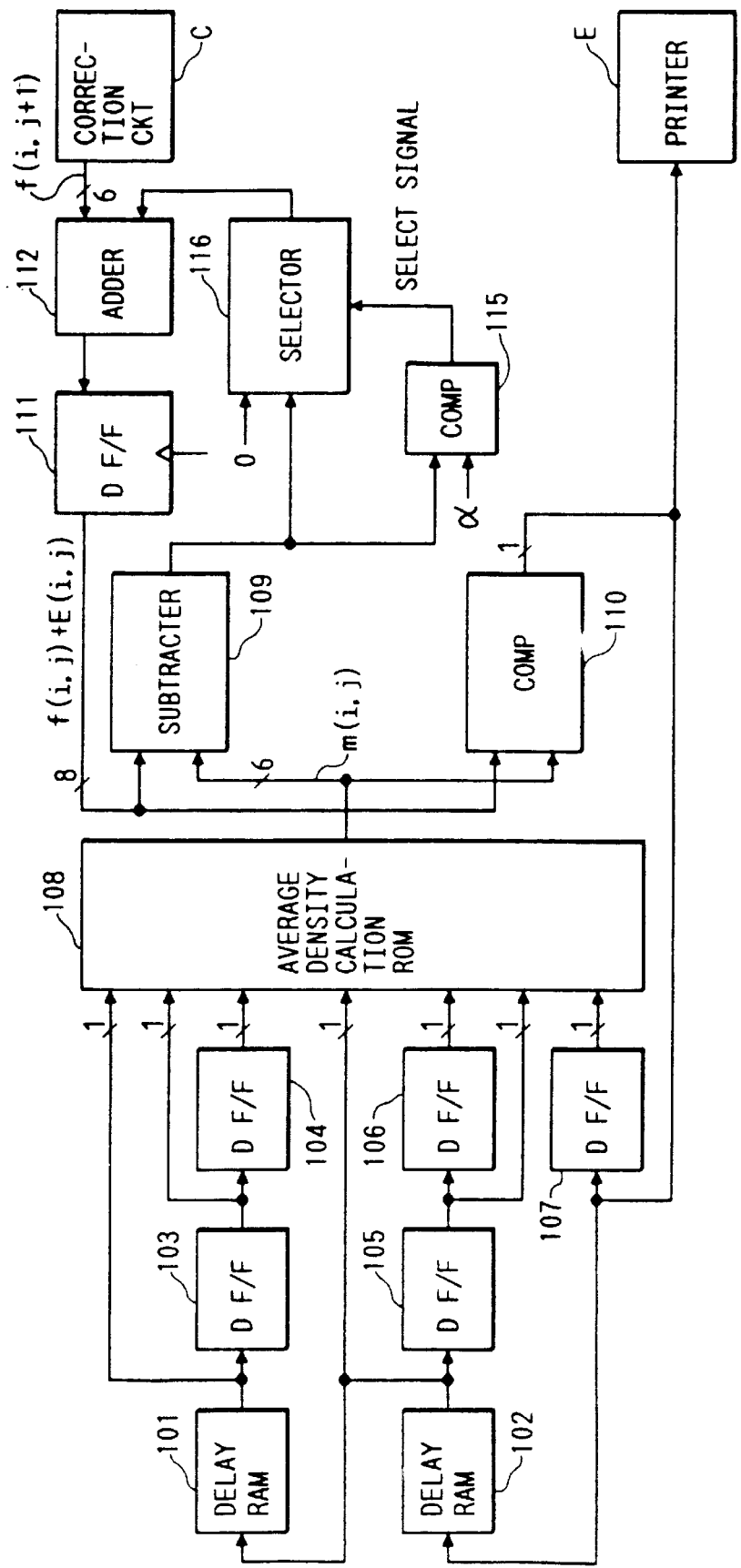
FIG. 19 is a block diagram showing a binarizing circuit of the embodiment 8.

FIG. 19 is a block diagram showing the details of the binarizing circuit D in the embodiment 8.

In FIG. 19, the same parts and elements as those shown in FIG. 16 are designated by the same reference numerals and their descriptions are omitted.

Reference numeral 115 denotes a comparator for comparing the difference between the multi-level data of the target pixel which is sent from the subtracter 109 and the threshold value with a predetermined value ($\alpha$). Reference numeral 116 indicates a selector for selecting either 0 or an output of the subtracter 109 on the basis of a select signal from the comparator.

In FIG. 19, the comparator 110 outputs the 1-bit data $B(i,j)$ which was binarized on the basis of the equation (14). The binary data is input to the RAMs 102 and 101 each for delaying it every line. The binary data $B(i-1,j+1)$ which was delayed by one line by the RAM 102 is output to the ROM 108. The binary data $B(i-2,j+1)$ which was delayed by two lines by the RAM 101 is output to the ROM 108.

Further, the D F/F 103 outputs the $B(i-2,j)$, the D F/F 104 outputs the $B(i-2,j-1)$, the D F/F 105 outputs the $B(i-1,j)$, the D F/F 106 outputs the $B(i-1,j-1)$, and the D F/F 107 outputs the $B(i,j-1)$, respectively, to the ROM 108.

As shown in FIG. 14, the binary data denotes the binary images of the peripheral pixels for the input image $f(i,j)$. By connecting the binary images to input addresses in the ROM 108, the binarization threshold value can be obtained at a high speed because the binarization threshold value $m(i,j)$ shown in the equation (14) has previously been stored in the ROM 108 on the basis of the equation (13).

The threshold value is input to the subtracter 109 and comparator 110. On the other hand, $f(i,j)+E(i,j)$ is input from the D F/F 111 to the subtracter 109 and comparator 110.

On the basis of the two inputs, the subtracter 109 calculates the difference $$E(i,j+1)=f(i,j)+E(i,j)-m(i,j) \qquad (18)$$

between both sides of the inequality in the equation (14).

On the other hand, the comparator 110 compares $f(i,j)+E(i,j)$ with $m(i,j)$ on the basis of the two inputs and outputs the binary data $B(i,j)$. On the other hand, the difference $E(i,j+1)$ which is output from the subtracter 109 is input to the selector 116 and the comparator 115 on the basis of the equation (18).

The comparator 115 compares the difference $E(i,j+1)$ with the constant a by the equation (16) and outputs the select signal to the selector 116 on the basis of the result of the comparison.

As a result of the select signal sent from the comparator 115, when the absolute value of the difference $E(i,j+1)$ is larger than a the selector 116 selects and outputs $E(i,j+1)=0$. If it is equal to or less than $\alpha$, the selector 116 directly selects and outputs the output signal of the subtracter 109.

The difference $E(i,j+1)$ is added to the input image data $f(i,j+1)$ by the adder 112. The D F/F 111 delays the addition value by a period of time of one clock of the data.

In a manner similar to the above, by repeating the above processes, the binarization is sequentially executed.

The weighting mask shown in FIG. 17 is used.

As described above, according to the embodiment 8, the average density is calculated by using only the binary data which was binarized and the input multi-level data is binarized by using the average density as a threshold value. Therefore, a processing amount for binarization can be reduced as compared with that in the average density approximating method. Moreover, when the difference between the input multi-level data which is generated upon binarization of the input multi-level data and the average density lies within a predetermined range, the difference is corrected, so that the gradations can be remarkably improved.

Further, in the embodiment, when the difference between the average density and the input multi-level data is larger than a predetermined value, the difference is not corrected. Thus, the deterioration in resolution due to the preservation of the density is prevented and the edge portion can be clearly reproduced.

In the embodiment, the binary difference E has been distributed to only the next pixel and corrected. However, if the binary difference E is distributed to a pluraltiy of pixels in the main scanning direction in a manner such that, for instance, in FIG. 14, $3E(i,j+1)/4$ is distributed to the pixel $(i,j+1)$ and $E(i,j+1)/4$ is distributed to the pixel $(i,j+2)$, the reproducing capability of the gradations is improved even if the average processing mask is small.

On the other hand, the binary difference can be also two-dimensionally distributed to a plurality of pixels near the target pixel at a predetermined distribution ratio in a manner similar to the case of the error diffusion method. In this case, although a hardware construction is slightly complicated, the uniform image can be obtained in the sub scanning direction as well as the main scanning direction and the reproducibility is improved.

On the other hand, although the weighting mask has been increased as the pixel is close to the target pixel, its gradient and distribution are not limited. The pixels existing at the discrete positions which are not neighboring can be also used.

Embodiment 9

In the embodiment 8, the binary difference E has been divided into two cases shown by the equations (16) and (17) and when the difference E is equal to or larger than a predetermined value using the constant $\alpha$, the difference E is set to 0 and is not distributed to the next pixel. However, the value of the constant $\alpha$ can be also changed in accordance with the average density value or target pixel density value.

For instance, as shown in FIG. 20, if the value of $\alpha$ is set to be reduced as the average density approaches 0 or 1, the edge portion of a black character in the white background, a blank character in the black background, or the like can be more finely binarized.

Embodiment 10

The following equation (19) can be also used in place of the equation (16) in the embodiment 8.

$$\left.\begin{array}{c} \text{In the case where } m(i,j) < k \text{ and} \\ f(i,j) + e(i,j) - m(i,j) > \alpha \\ \text{or} \\ m(i,j) > 1 - k \text{ and} \\ f(i,j) + E(i,j) - m(i,j) < -\alpha, \\ E(i,j+1) = 0 \end{array}\right\} \quad (19)$$

where, k is a constant and if k is set to about 0 or 1, the good result can be derived.

According to the embodiment, by setting the difference E to 0 in the case where the average density value approached 0 or 1, the character portion can be finely binarized in a manner similar to the embodiment 9.

Figure 21:
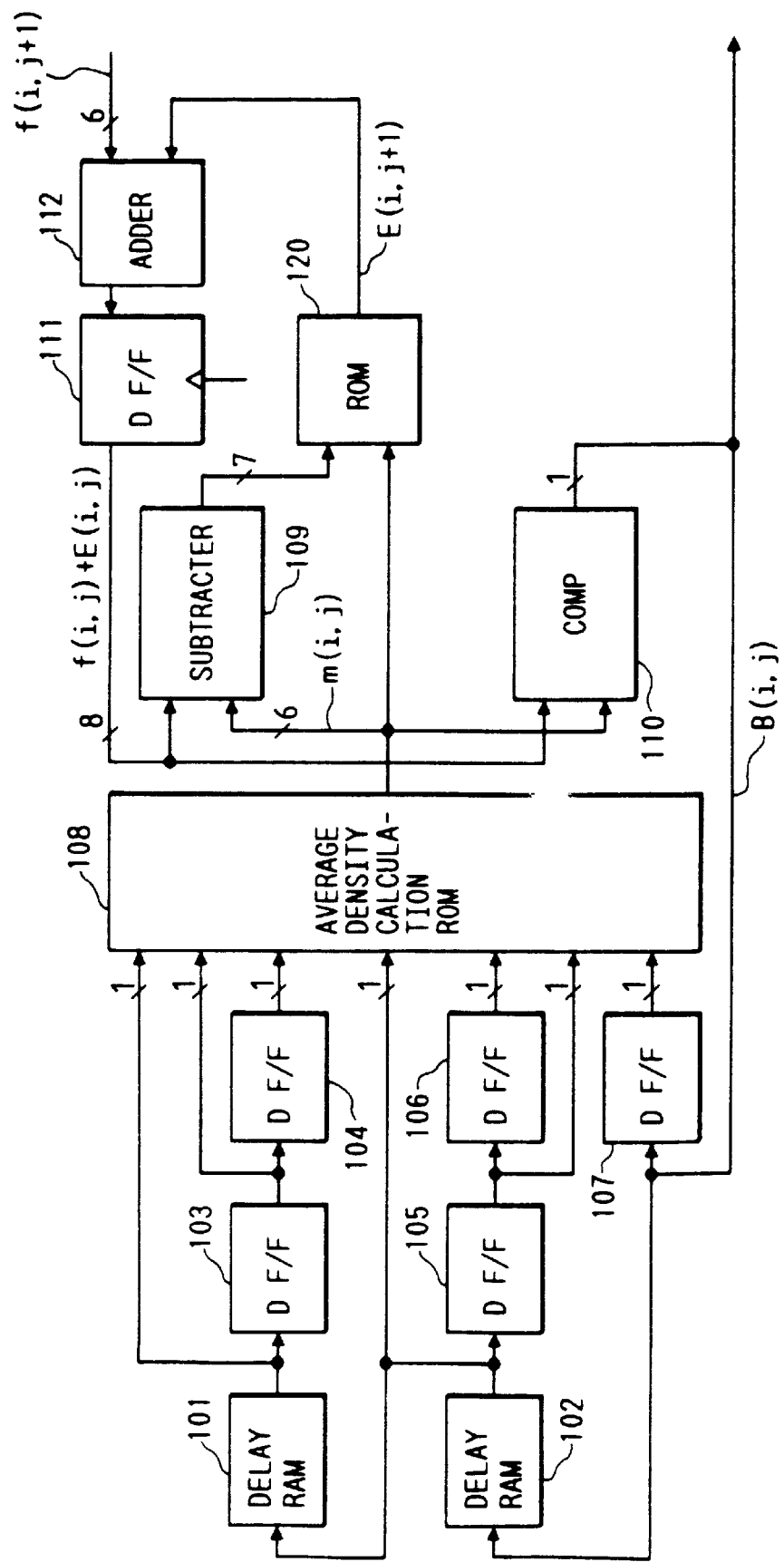
FIG. 21 is a block diagram showing binarizing circuits in the embodiments 9 and 10.

As shown in FIG. 21, in the embodiments 9 and 10, by inputting the output m(i,j) of the average density calculation ROM 108 to an address terminal in a difference calculation ROM 120, those embodiments can be easily realized by the table converting processes based on the data which has previously been written.

Embodiment 11

In the embodiment 8, the weighting mask of a matrix of 3×3 as shown in an example of FIG. 17A has been used. However, generally, to smoothly binarize the half-tone portion, it is desirable to set the weight of the pixel adjacent to the target pixel to a small value.

Therefore, in the case of using the weighting mask of a matrix of 3×5 shown in FIG. 17B, R(i−1,j) and R(i,j−1) in FIG. 17B are set to 7/48=0.15 while those in FIG. 17A in the embodiment 8 are set to 5/21=0.24, so that the half-tone portion can be more smoothly binarized and reproduced.

In the embodiment 8, the calculation of the average density m has easily been realized by the ROM table. However, such calculation can be also realized by using seven AND gates and a plurality of adders. In this case, the processing speed can be further made high. On the other hand, by assembling such a processing circuit into a gate array or the like, a hardware scale can be remarkably reduced.

In the embodiment, the average density m which is used in the present system has been used in the alculation of the correction value E for preservation of all densities during the processing. However, the determination or the like to see if E is set to 0 or not in the edge portion or the like can be also realized by the well-known technique. For instance, a two-dimensional Laplacian is obtained from the image data to be binarized, this value is processed to a threshold value, the edge portion is discriminated on the basis of the result of the discrimination of such a threshold value process, and E is set to 0 in the edge portion. The similar result is also obtained even by such a method. On the other hand, the edge portion is designated in a wide area on the basis of a command obtained by the area designating operation by the operator without switching the process every pixel and E can be also set to 0 in such an area.

On the other hand, although the embodiment has been described with respect to the case where the number of kind of the input data is one (one color), the invention can be also applied to a color image by setting the input data to three colors of R, G, and B.

As described above, according to the invention, an image having excellent gradation and resolution can be obtained in a short time by a simple hardware construction.

The present invention is not limited to the foregoing embodiments but many modifications and variations are possible within the spirit and scope of the appended claims of the invention.

What is claimed is:

1. An image processing apparatus, which converts a signal representing multi-level data into a signal representing binary data, comprising:

input means for scanning an original image and producing and inputting the signal representing the multi-level data of a target pixel;

calculating means for obtaining an average density value of a predetermined region;

binarizing means for binarizing the multi-level data of the target pixel on the basis of the average density value obtained by the calculating means, to produce the signal representing the binary data;

correcting means for correcting for a difference which occurs when binarization is executed by said binarizing means, said difference being a difference between the input data and the average density value, wherein the correcting that is performed by said correcting means includes adding the difference between the input data and average density value to as-yet-unbinarized input data; and outputting means for outputting the signal representing binary data produced by said binarizing means, wherein said calculating means receives, as an input, binary data representing a plurality of previous pixels from said binarizing means and calculates the average density value from the received binary data within the predetermined region.

2. An apparatus according to claim 1, wherein said calculating means calculates an average density value $m_1$ of the predetermined region when the data of the target pixel was digitized to 1 and an average density value $m_2$ of the predetermined region when the data of the target pixel was digitized to 0.

3. An apparatus according to claim 2, wherein said calculating means calculates the average density value of the predetermined region by using a predetermined weighting mask.

4. An apparatus according to claim 2, wherein said digitizing means binarizes the data of the target pixel by using $(m_1+m_2)/2$ as a threshold value.

5. An apparatus according to claim 4, wherein said correcting means corrects the difference between the data of the target pixel and $m_1$ when the digitizing means digitized the data of the target pixel to 1.

6. An apparatus according to claim 4, wherein said correcting means corrects the difference between the data of the target pixel and $m_0$ when the digitizing means digitized the data of the target pixel to 0.

7. An apparatus according to claim 1, wherein said input means inputs data obtained by adding, to the data of the target pixel, difference data which had been generated upon digitization of a previous pixel.

8. An apparatus according to claim 1, wherein said calculating means calculates an average density value m from the data of the predetermined region which has already been digitized before the target pixel.

9. An apparatus according to claim 8, wherein said calculating means comprises a ROM arranged to serve as a look-up table to output the average density value m of the predetermined area responsive to the digitized data of the predetermined area being input to the ROM as an address value.

10. An apparatus according to claim 8, wherein said digitizing means binarizes the data of the target pixel by using the average density value m as a threshold value.

11. An apparatus according to claim 1, wherein said correcting means corrects the difference so as to improve gradation when the difference which occurs upon said digitization exists within a predetermined value.

12. An apparatus according to claim 11, wherein said correcting means does not correct the difference so as to improve a resolution when the difference which occurs upon digitization is equal to or larger than a predetermined value.

13. An image processing apparatus, which converts a signal representing multi-level data into a signal representing binary data, said image processing apparatus comprising:
input means for scanning an original image and producing and inputting the signal representing multi-level data of a target pixel;
calculating means for obtaining an average density value of a predetermined region;
binarizing means for binarizing the data of the target pixel on the basis of the average density value obtained by said calculating means;
correcting means for correcting for a difference which occurs upon binarization when the difference is equal to or less than a predetermined value, said difference being a difference between the input data and the average density value, and the correcting by said correcting means including adding the difference between the input data and average density value to as-yet-unbinarized input data; and
outputting means for outputting the signal representing binary data produced by said binarizing means,
wherein said calculating means receives, as an input, binary data representing a plurality of previous pixels from said binarizing means and.calculates the average density value from the received binary data within the predetermined region, and
wherein said correcting means provides improved resolution when the difference which occurs upon binarization is larger than a predetermined value.

14. An apparatus accoridng to claim 13, wherein said calculating means calculates an average density value $m_1$ of the predetermined region when the data of the target pixel was digitized to 1 and an average density value $m_2$ of the predetermined region when the data of the target pixel was digitized to 0.

15. An apparatus according to claim 14, wherein said calculating means calculates the average density value of the predetermined region by using a predetermined weighting mask.

16. An apparatus according to claim 14, wherein said digitizing means binarizes the data of the target pixel by using $(m_1+m_2)/2$ as a threshold value.

17. An apparatus according to claim 16, wherein said correcting means corrects the difference between the data of the target pixel and $m_1$ when the digitizing means digitized the data of the target pixel to 1.

18. An apparatus according to claim 16, wherein said correcting means corrects the difference between the data of the target pixel and $m_0$ when the digitizing means digitized the data of the target pixel to 0.

19. An apparatus according to claim 13, wherein said input means inputs data obtained by adding, to the data of the target pixel, difference data which had been generated upon digitization of a previous pixel.

20. An apparatus according to claim 13, wherein said calculating means calculates an average density value m from the data of the predetermined region which has already been digitized before the target pixel.

21. An apparatus according to claim 20, wherein said calculating means comprises a ROM arranged to serve as a look-up table to output the average density value m of the predetermined area responsive to the digitized data of the predetermined area being input to the ROM as an address value.

22. An apparatus according to claim 20, wherein said digitizing means binarizes the data of the target pixel by using the average density value m as a threshold value.

23. An apparatus according to claim 13, wherein said correcting means does not correct the difference so as to improve a resolution when the difference which occurs upon digitization is equal to or larger than a predetermined value.

24. An image processing apparatus, which converts a signal representing multi-level data into a signal representing binary data, comprising:
input means for scanning an original image and producing and inputting the signal representing multi-level data of a target pixel;
memory means for storing the binary data obtained by binarizing the multi-level data;
calculating means for obtaining an average density value of a predetermined region by using binary data which has already been binarized with respect to a pixel before the target pixel and which has beenstored in said memory means without using data of the target pixel;
binarizing means for binarizing the multi-level data of the target pixel on the basis of the average density value obtained by the calculating means, to produce the signal representing binary data, and storing the binary data obtained in the binarization in said memory means;
correcting means for correcting for a difference which occurs when binarization is executed by said binarizing means, said difference being a difference between the input data and the average density value, wherein the correcting that is performed by said correcting means includes adding the difference between the input data and average density value to as-yet-unbinarized input data; and
outputting means for outputting the signal representing binary dataiproduced by said binarizing means.

25. An apparatus according to claim 24, wherein said calculating means calculates the average density value by using a weighting mask from binary data of the predetermined region.

26. An apparatus according to claim 25, wherein said binarizing means binarizes the data of the target pixel by using the average density value as a threshold value.

27. An apparatus according to claim 24, further having correcting means for correcting a difference which occurs when the binarization is executed by the binarizing means.

28. An apparatus according to claim 27, wherein said correcting means corrects the difference so as to improve gradation when the difference which occurs upon digitization exists within a predetermined value.

29. An image processing apparatus, which converts a signal representing multi-level data into a signal representing binary data, comprising:
input means for scanning an original image and producing and inputting the signal representing multi-level data of a target pixel;
memory means for storing the binary data obtained by binarizing the mnulti-level data of a plurality of previous pixels;
calculating means for obtaining an average density value of a predetermined region by using data which has been binarized and which has been stored in said memory means;

binarizing means for binarizing the multi-level data of the target pixel on the basis of the average density value obtained by the calculating means, to produce the signal representing binary data, and storing in said memory means the binary data obtained in the binarization;

correcting means for correcting for a difference which occurs when the data of the target pixel is binarized, wherein said difference is a difference between the input data and the average density value, the correcting by said correcting means including adding the difference between the input data and average density value to as-yet-unbinarized input data; and outputting means for outputting the signal representing binary data produced by said binarizing means.

30. An apparatus according to claim 29, wherein said calculating means calculates the average density value by using a weighting mask from binary data of the predetermined region.

31. An apparatus according to claim 30, wherein said binarizing means binarizes the data of the target pixel by using the average density value as a threshold value.

32. An apparatus according to claim 29, wherein said correcting means corrects the difference so as to improve gradation when the difference which occurs upon digitization exists within a predetermined value.

33. An image processing apparatus, comprising:

input means for scanning an original image and producing and inputting a signal representing data of a target pixel;

calculating means for obtaining an average density value of a predetermined region by using binary data obtained by binarization of a plurality of previous pixels;

binarizing means for binarizing the data of the target pixel on the basis of the average density value obtained by said calculating means;

correcting means for correcting for a difference which occurs when the data of the target pixel is binarized when the difference is less than a predetermined value, said difference being a difference between the input data and the averate density value, and the correcting by said correcting means including adding the difference between the input data and average density value to as-yet-unbinarized input data; and outputting means for outputting a signal representing binary data produced bv said binarizing means, wherein said correcting means provides improved resolution when the difference which occurs upon binarization is larger than the predetermined value.

34. An apparatus according to claim 33, wherein said calculating means calculates the average density value by using a weighting mask from binary data of the predetermined region.

35. An apparatus according to claim 34, wherein said binarizing means binarizes the data of the target pixel by using the average density value as a threshold value.

36. An apparatus according to claim 33, wherein said correcting means does not correct the difference so as to improve a resolution when the difference which occurs upon binarization is equal to or larger than the predetermined value.

37. An image processing method, which converts a signal representing multilevel data into a signal representing binary data, comprising the steps of:

scanning an original image and producing and inputting the signal representing the multi-level data of a target pixel;

performing a calculation to obtain an average density value of a predetermined region;

binarizing the multi-level data of the target pixel on the basis of the average density value obtained in said calculation-performing step, to produce the signal representing the binary data;

correcting for a difference which occurs when binarization is executed in said binarizing step, that difference being a difference between the input data and the average density value, wherein the correcting that is performed in said correcting step includes adding the difference between the input data and average density value to as-yet-unbinarized input data; and outputting the signal representing binary data produced in said binarizing step, wherein, in said calculation-performing step, there is received, as an input, binary data representing a plurality of previous pixels from said binarizing step, and the average density value from the received binary data within the predetermined region is calculated.

* * * * *

UNITED STATES PATENT AND TRADEMARK OFFICE
CERTIFICATE OF CORRECTION

PATENT NO.    : 6,134,355
DATED         : October 17, 2000
INVENTOR(S)   : YASUHIRO YAMADA, ET AL.

It is certified that error appears in the above-identified patent and that said Letters Patent is hereby corrected as shown below:

ON THE TITLE PAGE AT [56] References Cited

U.S. Patent Documents, "4,371,179    2/1983" should read --4,371,179    2/1982--.

ON THE TITLE PAGE AT [56] References Cited

Primary Examiner, "Bravesh Mehta" should read --Bhavesh Mehta--.

ON THE TITLE PAGE AT [57] in the Abstract

"pre-determined" should read --predetermined--.

Sheet 12

FIG. 15, "THRSHOLD" should read --THRESHOLD--.

COLUMN 3

Line 47, "black" should read --black)--, and "and: (where" should read --and: ¶

$$m_0(i, j) = \frac{1}{S} \sum_{x=0}^{2} \sum_{y=-1}^{1} R(x,y) \cdot B(i-x, j-y) \quad \ldots \quad ②$$

¶ (where--;

Line 49, "S-29." should read --¶ S denotes the sum of weights R, for instance, in the case of using the weighting mask 1 in FIG. 3, S=29.--;
Line 52, "is binarized" should be deleted--.

COLUMN 4

Line 26, "because)" should read --because,--

COLUMN 5

UNITED STATES PATENT AND TRADEMARK OFFICE
CERTIFICATE OF CORRECTION

PATENT NO.   : 6,134,355
DATED        : October 17, 2000
INVENTOR(S)  : YASUHIRO YAMADA, ET AL.          Page 2 of 4

It is certified that error appears in the above-identified patent and that said Letters Patent is hereby corrected as shown below:

Line 36, "equaiton" should read --equation--;
    Line 59, "known," should read --known--.

COLUMN 6

Line 66 "[f(i,j) E(i,j)" should read --[f(i,j) +E(i,j)--.

COLUMN 8

Line 25, "form" should read --from--,
    Line 59, "ulti-level" should read --multi-level--.

COLUMN 11

Line 13, "+$M_0$" should read --+$m_0$--;
    Line 14, "0" should read --9--;
    Line 39, "sigh" should read --sign--.

COLUMN 12

Line 23, "divided to" should read --divided into--;
    Line 32, "blank" should read --while--;
    Line 45, ¶ Where,' should read --where--;
    Line 67, "14," should read --3,--;

COLUMN 13

Line 25, "mot" should read --$M_0$,--;
    Line 46, "position" should read --positions--.

COLUMN 15

Line 1, "¶The binary" should read --The binary--;
    Line 42, "calcualted" should read --calculated--;
    Line 50, "corrected" should read --corrected,--.

UNITED STATES PATENT AND TRADEMARK OFFICE
CERTIFICATE OF CORRECTION

PATENT NO. : 6,134,355
DATED : October 17, 2000
INVENTOR(S) : YASUHIRO YAMADA, ET AL.

It is certified that error appears in the above-identified patent and that said Letters Patent is hereby corrected as shown below:

COLUMN 16

Line 60, "such as image" should read --such an image--.

COLUMN 17

Line 5, "deterioration in resolutionor the pixel in such a case and the" should be deleted;
Line 16, "difference is" should read --difference which is--;
Line 65, "constant a" should read --constant $\alpha$--.

COLUMN 18

Line 3, "than a" should read --than $\alpha$--;
Line 32, "pluraltiy" should read --plurality--;
Line 63, "blank" should read --white--.

COLUMN 19

Line 10, "where," should read --where--;
Line 41, "alculation" should read --calculation--.

COLUMN 21

Line 39, "accordng" should read --according--.

COLUMN 22

Line 24, "beenstored" should read --been stored--;
Line 40, "dataiproduced" should read data produced--;
Line 61, "mnulti-level" should read --multi-level--.

UNITED STATES PATENT AND TRADEMARK OFFICE
CERTIFICATE OF CORRECTION

PATENT NO. : 6,134,355
DATED : October 17, 2000
INVENTOR(S) : YASUHIRO YAMADA, ET AL.

It is certified that error appears in the above-identified patent and that said Letters Patent is hereby corrected as shown below:

<u>COLUMN 23</u>

Line 43, "averate" should read --average--.

Signed and Sealed this

First Day of May, 2001

NICHOLAS P. GODICI

*Attest:*

*Attesting Officer*　　*Acting Director of the United States Patent and Trademark Office*